United States Patent
Kim et al.

(10) Patent No.: US 11,279,232 B2
(45) Date of Patent: Mar. 22, 2022

(54) VEHICLE CONTROL DEVICE MOUNTED ON VEHICLE AND METHOD FOR CONTROLLING THE VEHICLE

(71) Applicant: LG ELECTRONICS INC., Seoul (KR)

(72) Inventors: Sujin Kim, Seoul (KR); Seongmin Kim, Seoul (KR); Chulhee Lee, Seoul (KR); Honggul Jun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 447 days.

(21) Appl. No.: 16/196,802

(22) Filed: Nov. 20, 2018

(65) Prior Publication Data

US 2019/0176625 A1   Jun. 13, 2019

(30) Foreign Application Priority Data

Dec. 11, 2017   (KR) ........................ 10-2017-0169595

(51) Int. Cl.
*B60K 35/00*   (2006.01)
*B60K 37/02*   (2006.01)
*B60K 37/06*   (2006.01)

(52) U.S. Cl.
CPC .............. *B60K 35/00* (2013.01); *B60K 37/02* (2013.01); *B60K 37/06* (2013.01); *B60K 2370/146* (2019.05); *B60K 2370/1438* (2019.05); *B60K 2370/1468* (2019.05); *B60K 2370/1472* (2019.05); *B60K 2370/151* (2019.05);

(Continued)

(58) Field of Classification Search
CPC ........ B60K 35/00; B60K 37/02; B60K 37/06; B60K 2370/1472; B60K 2370/184; B60K 2370/195; B60K 2370/152; B60K 2370/166; B60K 2370/178; B60K 2370/182; B60K 2370/741
See application file for complete search history.

(56) References Cited

U.S. PATENT DOCUMENTS 5,748,109 A * 5/1998 Kosaka .............. G01C 21/3635
340/995.14
9,662,978 B2 * 5/2017 Sprickmann Kerkernick .............
B60K 35/00

(Continued)

FOREIGN PATENT DOCUMENTS

DE   102015217391 A1   3/2016
EP   3305577 A1   4/2018

(Continued)

*Primary Examiner* — Redhwan K Mawari
(74) *Attorney, Agent, or Firm* — Birch, Stewart, Kolasch & Birch, LLP

(57) ABSTRACT

A vehicle control device for controlling a vehicle including first and second display units disposed at different positions therein, can include a communication unit configured to communicate with the first and second display units; and a controller configured to in response to an occurrence of a preset condition, make a selection of at least one of the first display unit and the second display unit, and display a first execution screen of an application on the first display unit or a second execution screen of the application on the second display unit according to the selection, or change the first execution screen displayed on the first display unit or the second execution screen displayed on the second display unit according to the selection.

17 Claims, 22 Drawing Sheets

(52) U.S. Cl.
CPC .. *B60K 2370/152* (2019.05); *B60K 2370/155* (2019.05); *B60K 2370/164* (2019.05); *B60K 2370/166* (2019.05); *B60K 2370/173* (2019.05); *B60K 2370/178* (2019.05); *B60K 2370/179* (2019.05); *B60K 2370/182* (2019.05); *B60K 2370/184* (2019.05); *B60K 2370/186* (2019.05); *B60K 2370/193* (2019.05); *B60K 2370/195* (2019.05); *B60K 2370/21* (2019.05); *B60K 2370/48* (2019.05); *B60K 2370/52* (2019.05); *B60K 2370/736* (2019.05); *B60K 2370/739* (2019.05); *B60K 2370/741* (2019.05)

(56) References Cited

U.S. PATENT DOCUMENTS

| | | | | |
|---|---|---|---|---|
| 2012/0060089 A1* | 3/2012 | Heo | ................ | G06F 3/1431 |
| | | | | 715/702 |
| 2013/0038434 A1* | 2/2013 | Yamada | ............ | B60K 37/06 |
| | | | | 340/425.5 |
| 2015/0015479 A1* | 1/2015 | Cho | ................ | G06F 3/1423 |
| | | | | 345/156 |
| 2015/0019963 A1* | 1/2015 | Park | ................ | G06F 3/0433 |
| | | | | 715/708 |
| 2016/0075235 A1* | 3/2016 | Takamatsu | ........ | B60K 35/00 |
| | | | | 340/438 |
| 2016/0227009 A1* | 8/2016 | Kim | ................ | H04W 4/80 |
| 2017/0212633 A1* | 7/2017 | You | ................ | G06F 3/04883 |
| 2017/0253122 A1* | 9/2017 | Jun | ................ | B60K 35/00 |
| 2017/0341580 A1* | 11/2017 | Okuda | .............. | B60R 1/00 |
| 2018/0253200 A1* | 9/2018 | Abe | ................ | G01C 21/3664 |
| 2018/0345790 A1* | 12/2018 | Mimura | ........... | B60K 35/00 |
| 2019/0176625 A1* | 6/2019 | Kim | ................ | B60K 37/06 |
| 2019/0378475 A1* | 12/2019 | Lim | ................ | B60R 16/02 |

FOREIGN PATENT DOCUMENTS

| | | |
|---|---|---|
| JP | 5881398 B2 | 3/2016 |
| KR | 10-2015-0062317 A | 6/2015 |
| KR | 10-2016-0022651 A | 3/2016 |
| KR | 10-2017-0104372 A | 9/2017 |

* cited by examiner

FIG. 1
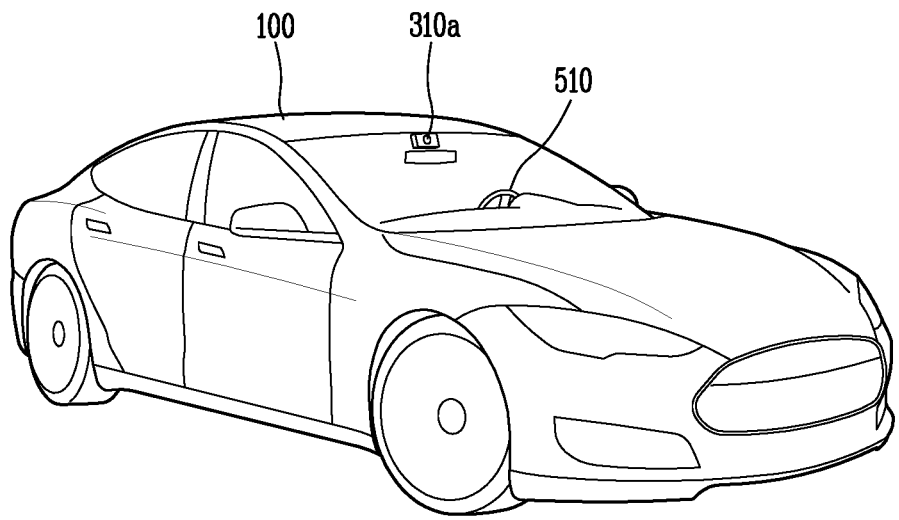
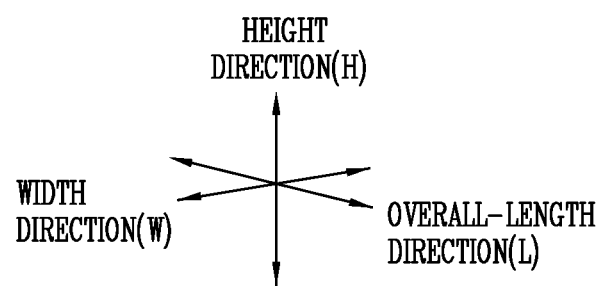

FIG. 23
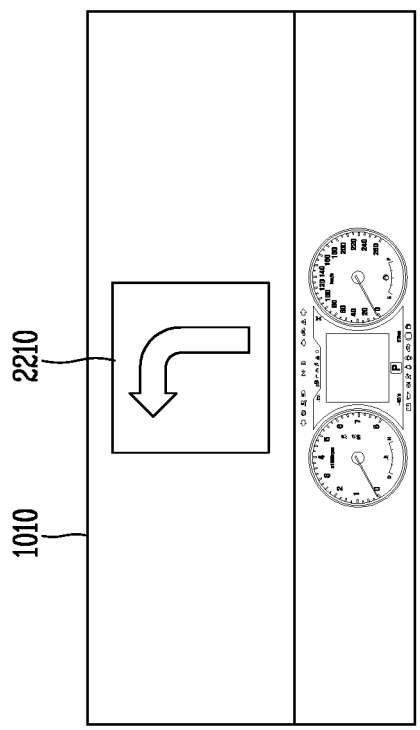
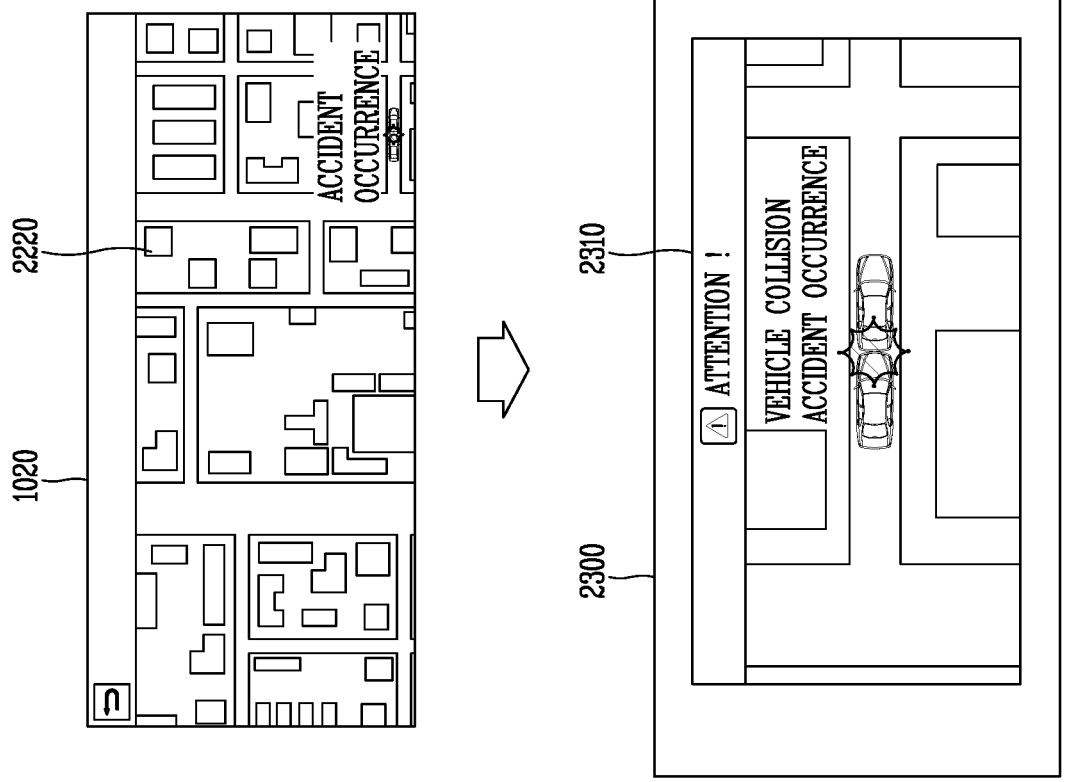

VEHICLE CONTROL DEVICE MOUNTED ON VEHICLE AND METHOD FOR CONTROLLING THE VEHICLE

CROSS-REFERENCE TO RELATED APPLICATION

Pursuant to 35 U.S.C. § 119(a), this application claims the benefit of an earlier filing date of and the right of priority to Korean Application No. 10-2017-0169595, filed in the Republic of Korea on Dec. 11, 2017, the contents of which are incorporated by reference herein in its entirety.

BACKGROUND OF THE INVENTION

1. Field of the Invention

This specification relates to a vehicle control device provided on or in a vehicle, and a method for controlling the vehicle.

2. Background of the Invention

A vehicle is an apparatus capable of moving a user in the user-desired direction, and a representative example may be a car.

In addition, for convenience of a user using a vehicle, various types of sensors and electronic devices are provided in the vehicle. Specifically, a study on an Advanced Driver Assistance System (ADAS) is actively undergoing. In addition, an autonomous vehicle is actively under development.

As a development of an advanced driving assist system (ADAS) is actively ongoing, a technology to maximize a user's convenience and safety in driving a vehicle is required.

In order to provide various ADAS information to a person inside a vehicle or to receive a feedback, the number of display panels mounted in the vehicle is increased, and a size thereof is increased.

For instance, a display is mounted to a dashboard, a center information display (CID), a rear seat entertainment (RSE), a head up display (HUD), a rear view mirror (a room mirror), a side mirror, etc.

Accordingly, required is an additional review to determine a display which is to provide specific information, and how to move and share information between displays.

SUMMARY OF THE INVENTION

Therefore, an aspect of the detailed description is to provide a vehicle control device capable of selecting a display unit which is to output an execution screen of an application according to a predetermined condition, and capable of controlling each selected display unit to output a different execution screen of an application, and a method for controlling a vehicle.

To achieve these and other advantages and in accordance with the purpose of this specification, as embodied and broadly described herein, there is provided a vehicle control device for controlling a vehicle including first and second display units disposed on different positions therein, the device comprising: a communication unit configured to communicate with the first and second display units; and a controller configured to select at least one of the first and second display units according to a preset condition, and configured to control the at least one display unit to output an execution screen of an application thereon, in which the execution screen includes a first execution screen set to be output to the first display unit, and a second execution screen set to be output to the second display unit, and the first and second execution screens are selectively output according to the at least one selected display unit.

In an embodiment, if the first display unit is selected according to a first condition while the second execution screen is being output to the second display unit, the controller controls the second display unit to terminate the display of the second execution screen, and controls the first display unit to start to display the first execution screen.

In another embodiment, if the first and second display units are selected according to a second condition while the second execution screen is being output to the second display unit, the controller controls the second display unit to maintain the display of the second execution screen, and controls the first display unit to start to display the first execution screen.

In another embodiment, the first and second execution screens are different execution screens with respect to one function provided from the application, and an information amount of the first execution screen is different from that of the second execution screen.

In another embodiment, the controller controls the first and second display units to change the first and second execution screens together thereon, according to a user input applied to one of the first and second display units.

In another embodiment, the application is a navigation application for providing road guidance information to a destination, and each of the first and second execution screens includes a map image provided from the navigation application.

In another embodiment, a first map image included in the first execution screen is formed to have a first scale, and a second map image included in the second execution screen is formed to have a second scale different from the first scale.

In another embodiment, the first execution screen includes turn by turn (TBT) information, and the second execution screen includes information on points of interest (POI) positioned at a path to a destination, together with the TBT information.

In another embodiment, if a preset user input is applied to the second execution screen, the controller controls the second display unit to change a screen ratio of the second execution screen, and controls the first display unit to change an amount of the TBT information output from the first execution screen, according to the changed screen ratio.

In another embodiment, the controller controls the first and second display units in a different manner, according to whether a preset user input is applied by a driver or a passenger.

In another embodiment, if the preset user input is applied by the driver, the controller controls the first and second display units to change both of the first and second execution screens. And if the preset user input is applied by the passenger, the controller controls the first and second display units such that the first execution screen is not changed but the second execution screen is changed.

In another embodiment, if the vehicle enters a region which is within a predetermined distance from a destination while the second execution screen is being output from the second display unit, the controller controls the first display unit to output the first execution screen thereon.

In another embodiment, if the vehicle enters a specific road while the second execution screen is being output to the second display unit, the controller controls the first display unit to output the first execution screen thereon.

In another embodiment, the controller controls the first display unit to output an around view monitoring (AVM) image captured in a first direction thereon, according to a predetermined condition, while an AVM image captured in a second direction is being output from the second display unit.

In another embodiment, the predetermined condition includes a situation that an object approaching from the first direction is sensed.

In another embodiment, the predetermined condition includes a situation that the first direction is a driver's blind spot.

To achieve these and other advantages and in accordance with the purpose of this specification, as embodied and broadly described herein, there is also provided a method for controlling a vehicle, comprising: selecting at least one of first and second display units disposed on different positions inside the vehicle, according to a preset condition; and controlling the at least one selected display unit to output an execution screen of an application, in which the execution screen includes a first execution screen set to be output to the first display unit, and a second execution screen set to be output to the second display unit, and the first and second execution screens are selectively output according to the at least one selected display unit.

In an embodiment, the controlling includes if the first display unit is selected according to a first condition while the second execution screen is being output to the second display unit, controlling the second display unit to terminate the display of the second execution screen, and controlling the first display unit to start to display the first execution screen.

In another embodiment, the controlling includes if the first and second display units are selected according to a second condition while the second execution screen is being output to the second display unit, controlling the second display unit to maintain the display of the second execution screen, and controlling the first display unit to start to display the first execution screen.

In another embodiment, the method further comprises controlling the first and second display units to change the first and second execution screens together thereon, according to a user input applied to one of the first and second display units.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings:

FIG. 1 is a view illustrating an appearance of a vehicle according to an embodiment of the present disclosure;

FIGS. 22 and 23 are conceptual views illustrating an embodiment where a third execution screen is output.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

When an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present invention may be understood as a conception including cars, motorcycles and the like. Hereinafter, the vehicle will be described based on a car.

The vehicle according to the embodiment of the present invention may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

FIG. 1 is a view illustrating appearance of a vehicle in accordance with an embodiment of the present invention.

Figure 2:
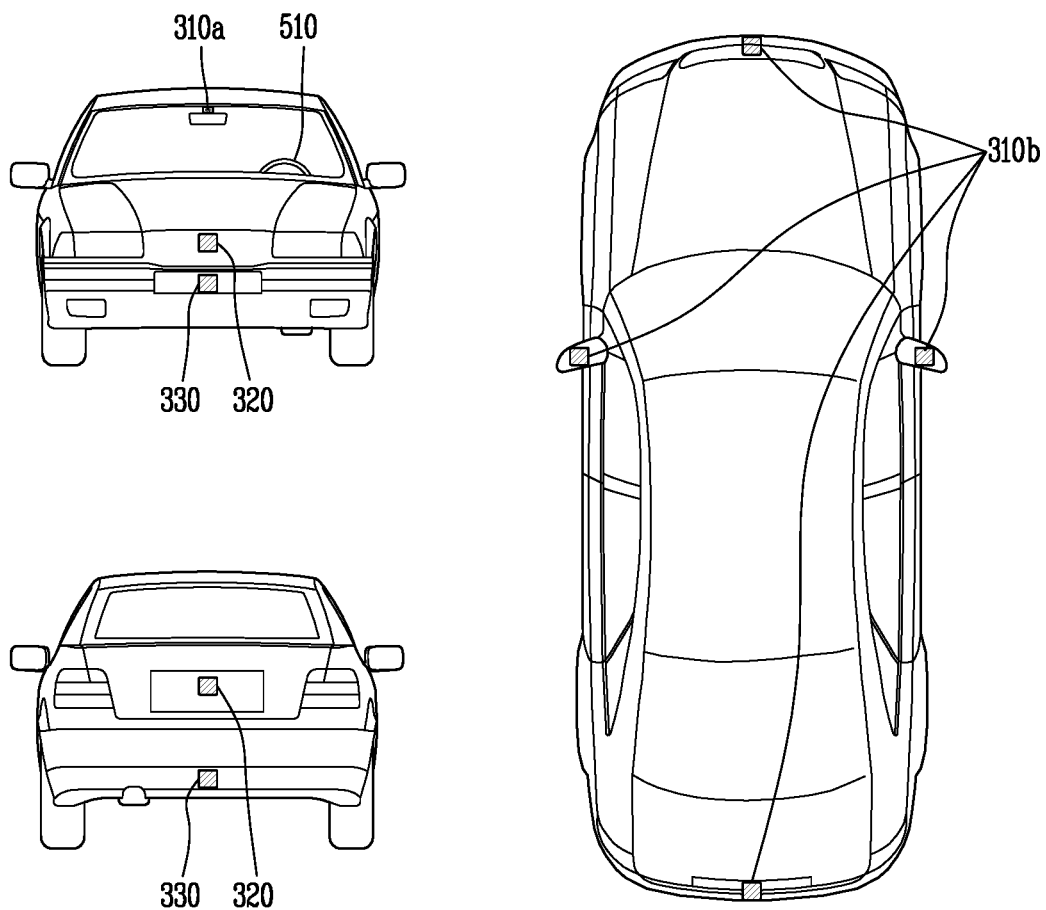
FIG. 2 is a view in which a vehicle according to an embodiment of the present disclosure is seen at various angles.

FIG. 2 is a view illustrating appearance of a vehicle at various angles in accordance with an embodiment of the present invention.

Figure 3:
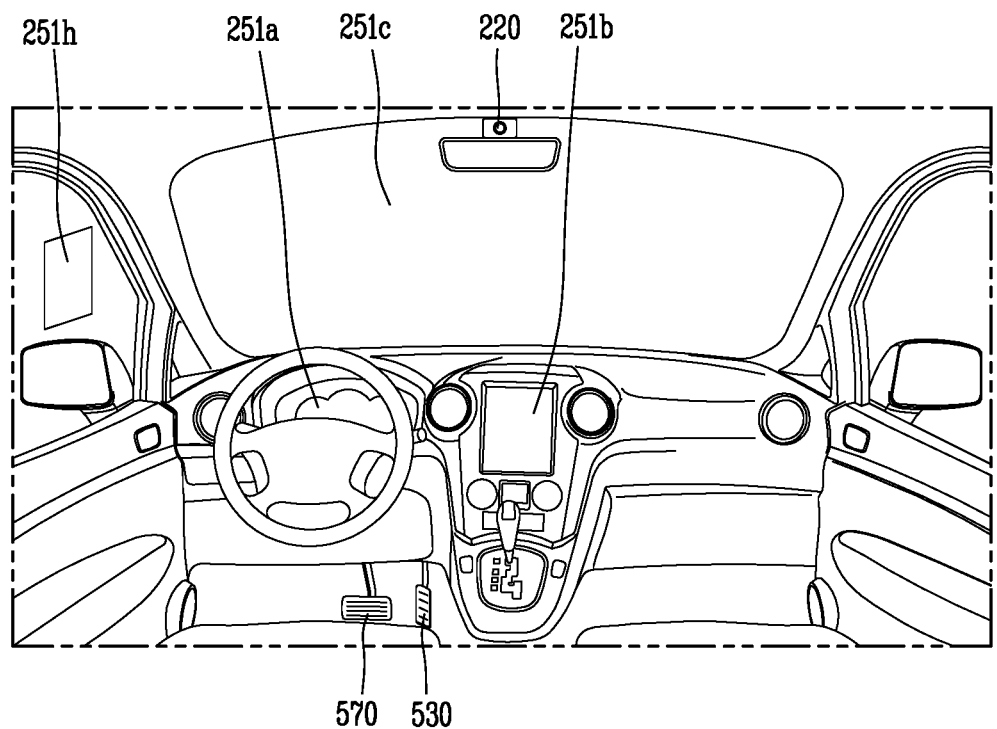
FIGS. 3 and 4 are views illustrating an inside of a vehicle according to an embodiment of the present disclosure.
Figure 4:
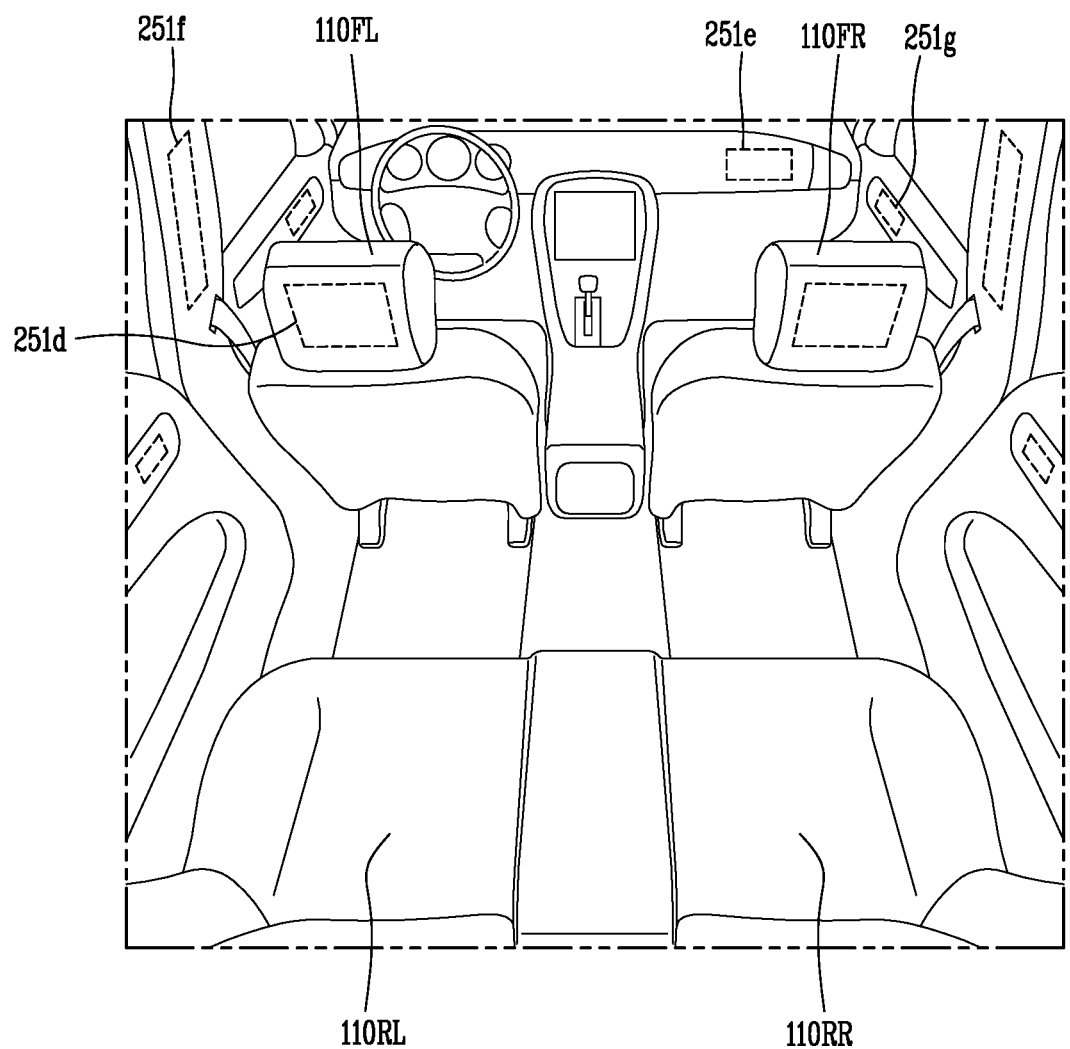

FIGS. 3 and 4 are views illustrating an inside of a vehicle in accordance with an embodiment of the present invention.

Figure 5:
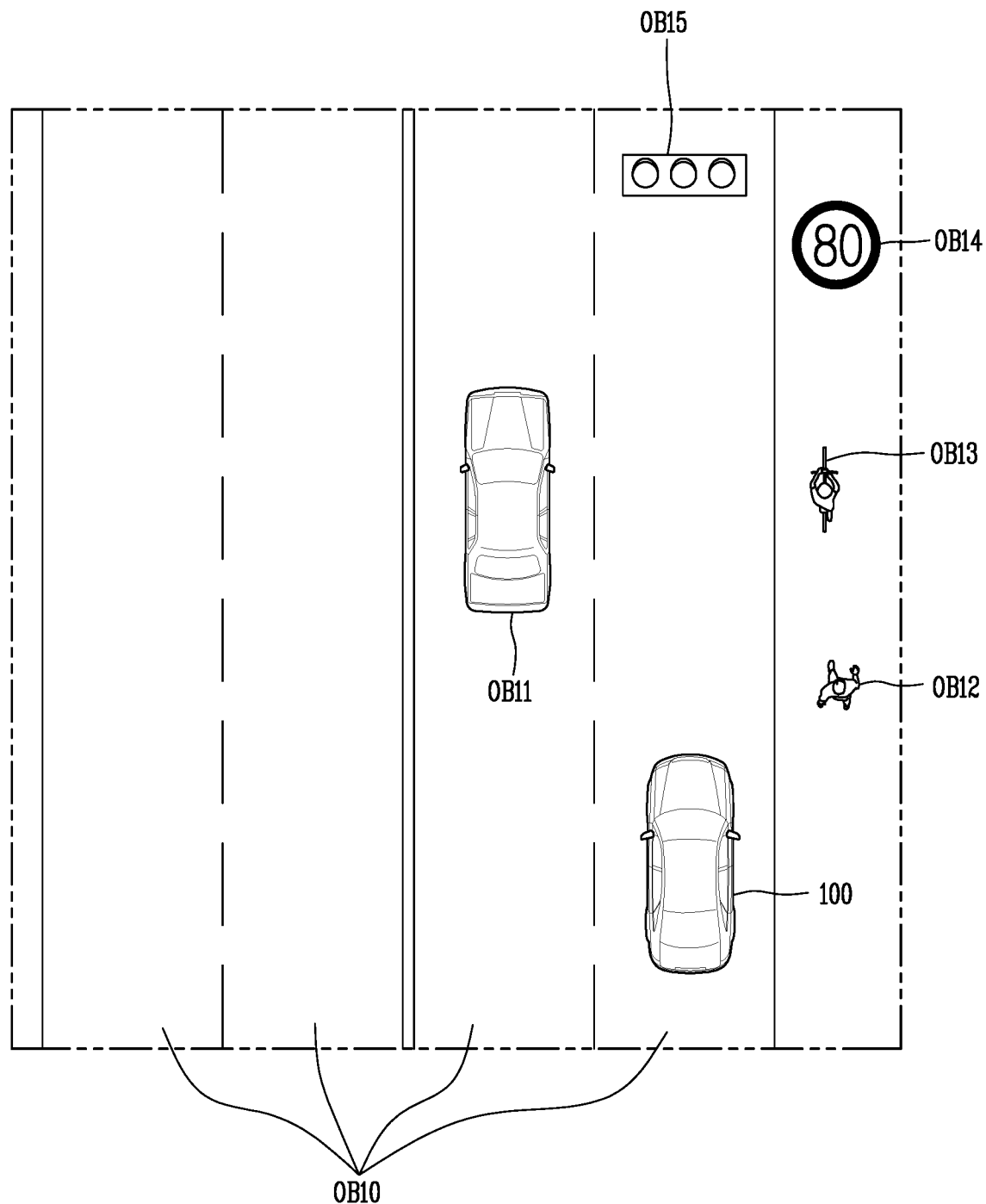
FIGS. 5 and 6 are views illustrating objects according to an embodiment of the present disclosure.
Figure 6:
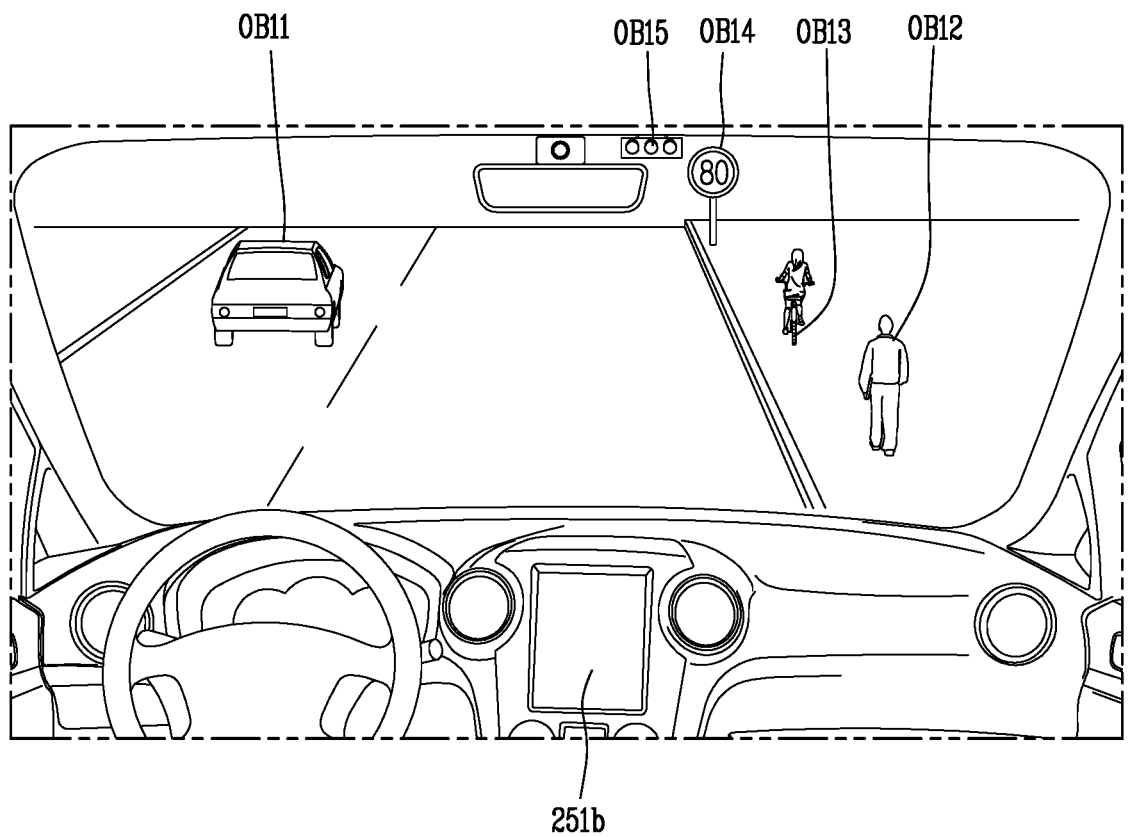

FIGS. 5 and 6 are reference views illustrating objects in accordance with an embodiment of the present invention.

Figure 7:
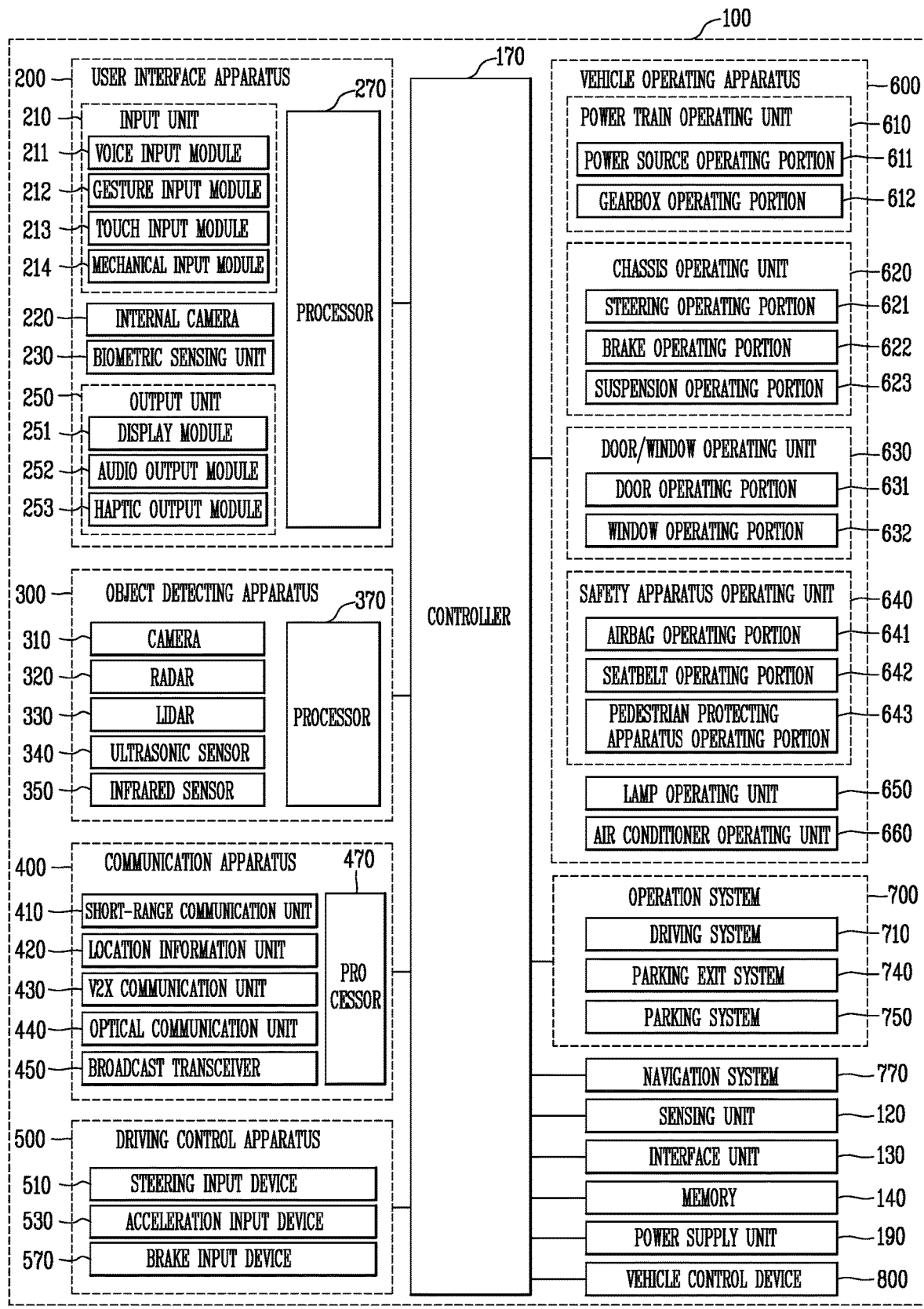
FIG. 7 is a block diagram illustrating a vehicle according to an embodiment of the present disclosure.

FIG. 7 is a block diagram illustrating a vehicle in accordance with an embodiment of the present invention As illustrated in FIGS. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, a operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The user interface apparatus 200 may include an input unit 210, an internal camera 220, a biometric sensing unit 230, an output unit 250 and a processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 210 may be disposed within the vehicle. For example, the input unit 200 may be disposed on one area of a steering wheel, one area of an instrument panel, one area of a seat, one area of each pillar, one area of a door, one area of a center console, one area of a headlining, one area of a sun visor, one area of a wind shield, one area of a window or the like.

The input unit 210 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The voice input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. Thus, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display unit 251 to implement a touch screen. The touch screen may provide an input interface and an output interface between the vehicle 100 and the user.

The mechanical input module 214 may include at least one of a button, a dome switch, a jog wheel and a jog switch. An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing module 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display and a transparent LED display. The transparent display may have adjustable transparency.

In addition, the user interface apparatus 200 may include a plurality of display modules 251*a* to 251*g*.

The display module 251 may be disposed on one area of a steering wheel, one area 521*a*, 251*b*, 251*e* of an instrument panel, one area 251*d* of a seat, one area 251*f* of each pillar, one area 251*g* of a door, one area of a center console, one area of a headlining or one area of a sun visor, or implemented on one area 251*c* of a windshield or one area 251*h* of a window.

The audio output module 252 converts an electric signal provided from the processor 270 or the controller 170 into an audio signal for output. Thus, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user can recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

In addition, the user interface apparatus 200 may be called as a display apparatus for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a geographical feature, an animal and the like.

The lane OB01 may be a driving lane, a lane next to the driving lane or a lane on which another vehicle comes in an opposite direction to the vehicle 100. The lanes OB10 may be a concept including left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB13 may refer to a vehicle (transportation facility) that is located near the vehicle 100 and moves using two wheels. The two-wheeled vehicle OB13 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The geographical feature may include a mountain, a hill and the like.

In addition, objects may be classified into a moving object and a fixed object. For example, the moving object may be a concept including another vehicle and a pedestrian. The fixed object may be a concept including a traffic signal, a road and a structure.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 300 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

In addition, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touchpad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touchpad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to some embodiments, the vehicle operating apparatus 600 may further include other components in addition to the components described, or may not include some of the components described.

In addition, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine can be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

In addition, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

In addition, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

In addition, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protecting apparatus operating portion 643 may perform an electronic control for a hood lift and a pedestrian airbag. For example, the pedestrian protecting apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may include a driving system 710, a parking exit system 740 and a parking system 750.

According to embodiments, the operation system 700 may further include other components in addition to components to be described, or may not include some of the components to be described.

In addition, the operation system 700 may include a processor. Each unit of the operation system 700 may individually include a processor.

According to embodiments, the operation system may be a sub concept of the controller 170 when it is implemented in a software configuration.

In addition, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In addition, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

In addition, the vehicle 100 according to an embodiment of the present invention may include a vehicle control device 800.

The vehicle control device 800 may control at least one of those components illustrated in FIG. 7. From this perspective, the vehicle control device 800 may be the controller 170.

Without a limit to this, the vehicle control device 800 may be a separate device, independent of the controller 170. When the vehicle control device 800 is implemented as a component independent of the controller 170, the vehicle control device 800 may be provided on a part of the vehicle 100.

Hereinafter, description will be given of an example that the vehicle control device 800 is a component separate from the controller 170 for the sake of explanation. In this specification, functions (operations) and control methods described in relation to the vehicle control device 800 may be executed by the controller 170 of the vehicle. That is, every detail described in relation to the vehicle control device 800 may be applied to the controller 170 in the same/like manner.

Also, the vehicle control device 800 described herein may include some of the components illustrated in FIG. 7 and various components included in the vehicle. For the sake of explanation, the components illustrated in FIG. 7 and the various components included in the vehicle will be described with separate names and reference numbers.

Hereinafter, a vehicle control device, and a method for controlling a vehicle according to an embodiment of the present invention will be explained in more detail with reference to the attached drawings.

Figure 8:
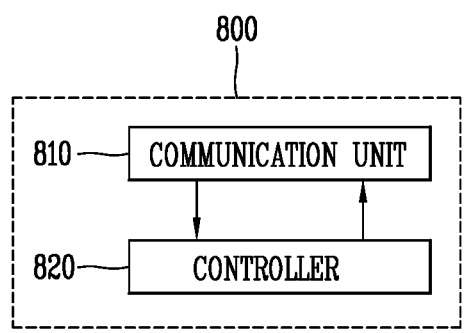
FIG. 8 is a block diagram illustrating a vehicle control device according to an embodiment of the present invention.

FIG. 8 is a block diagram illustrating a vehicle control device 800 according to an embodiment of the present invention.

Referring to FIG. 8, the vehicle control device 800 according to an embodiment of the present invention includes a communication unit 810 and a controller 820.

The vehicle control device 800 according to an embodiment of the present invention is an apparatus for controlling the vehicle 100 including first and second display units disposed on different positions therein.

The communication unit 810 communicates with the first and second display units.

The communication unit 810 is configured to communicate with the various components explained with reference to FIG. 7. For instance, the communication unit 810 may receive various types of information provided through a controller area network (CAN).

The first and second display units mean image display devices disposed on different positions inside the vehicle 100.

In an embodiment, the first and second display units may be any of displays arranged at one region of a steering wheel, one region 251a, 251b, 251e of an instrument panel, one region 251d of a seat, one region 251f of each pillar, one region 251g of a door, one region of a center console, one region of a head lining, one region of a sun visor, one region 251c of a wind shield, one region 251h of a window, etc.

More specifically, the first display unit may be a cluster, and the second display unit may be a center information display (CID).

A controller 820 may select at least one of the first and second display units according to a preset condition, and control the at least one selected display unit to output an execution screen of an application.

Here, the execution screen may include a first execution screen set to be output to the first display unit, and a second execution screen set to be output to the second display unit. The first and second execution screens may be selectively output according to the at least one selected display unit.

The preset condition may be a driver or passenger's touch input or gesture input applied to at least one of the first and second display units. For instance, if a driver applies a flicking gesture to the second display unit towards the first display unit, the first display unit may be selected.

As another example, the preset condition may include a situation that the vehicle 100 enters a spot which is within a predetermined distance from a destination or enters a specific road, a situation that an object approaching the vehicle 100 is sensed or there exists a blind spot, a situation that the vehicle 100 enters a specific building or a parking lot or a reverse gear is operated, a situation that there are more than a predetermined number of guidance spots at a specific section during a road guidance, a situation that the vehicle is initially driven, a situation that a speed camera is over a road on which the vehicle is running, etc. Detailed embodiments thereof will be explained later.

The application is an application executable in the vehicle 100, and may be output as different execution screens on the first and second display units when executed.

That is, when the application is executed, if the first display unit is selected, the first execution screen may be output to the first display unit. And if the second display unit is selected, the second execution screen may be output to the second display unit.

At least one of the first and second display units may be selected according to the aforementioned preset condition. More specifically, if only the first display unit is selected, only the first execution screen may be output to the first display unit. On the contrary, if both of the first and second display units are selected, the first and second execution screens may be output to the first and second display units, respectively.

The first and second execution screens may be different execution screens with respect to one function provided from the application, and an information amount of the first execution screen may be different from that of the second execution screen.

In an embodiment, the first and second execution screens may be formed of texts having different sizes. Alternatively, the first and second execution screens may be formed to have different numbers of letters (characters) or objects.

In another embodiment, when a navigation application is executed, the first execution screen may include turn by turn (TBT) information, and the second execution screen may include information on points of interest (POI) positioned at a path to a destination, together with the TBT information.

Figure 9:
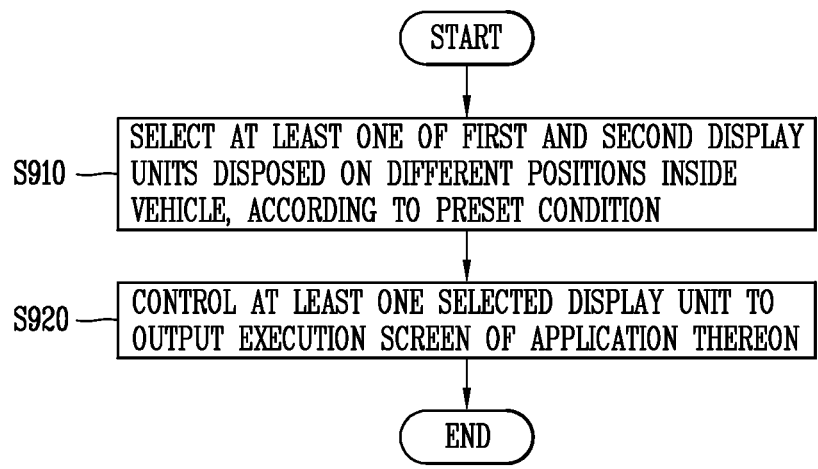
FIG. 9 is a flowchart illustrating a method for controlling a vehicle according to an embodiment of the present invention.

FIG. 9 is a flowchart illustrating a method for controlling the vehicle according to an embodiment of the present invention.

Referring to FIG. 9, at least one of the first and second display units disposed on different positions inside the vehicle 100 is selected according to a preset condition (S910).

Then, the at least one selected display unit is controlled to output an execution screen of an application thereon (S920).

Here, the execution screen may include a first execution screen set to be output to the first display unit, and a second execution screen set to be output to the second display unit. The first and second execution screens may be selectively output according to the at least one selected display unit.

In an embodiment, the control step (S920) may include controlling the second display unit to terminate the display of the second execution screen if the first display unit is selected according to a first condition while the second execution screen is being output to the second display unit, and controlling the first display unit to start to display the first execution screen.

In another embodiment, the control step (S920) may include controlling the second display unit to maintain the display of the second execution screen if the first and second display units are selected according to a second condition while the second execution screen is being output to the second display unit, and controlling the first display unit to start to display the first execution screen.

The control step (S920) may include controlling the first and second display units to change the first and second execution screens together thereon, according to a user input applied to one of the first and second display units.

In the following drawings, it will be explained that the first display unit is a cluster and the second display unit is a CID. However, the present invention is not limited to this, and the first and second display units may be any of the aforementioned various types of display units.

While the second execution screen is being output to the second display unit, if the first display unit is selected according to a first condition, the controller 820 can control the second display unit to terminate the display of the second execution screen, and may control the first display unit to start to display the first execution screen.

The first and second execution screens may be different execution screens with respect to one function provided from the application (e.g., two different execution screens for the same application function, such as navigation), and an information amount of the first execution screen may be different from that of the second execution screen.

Figure 10:
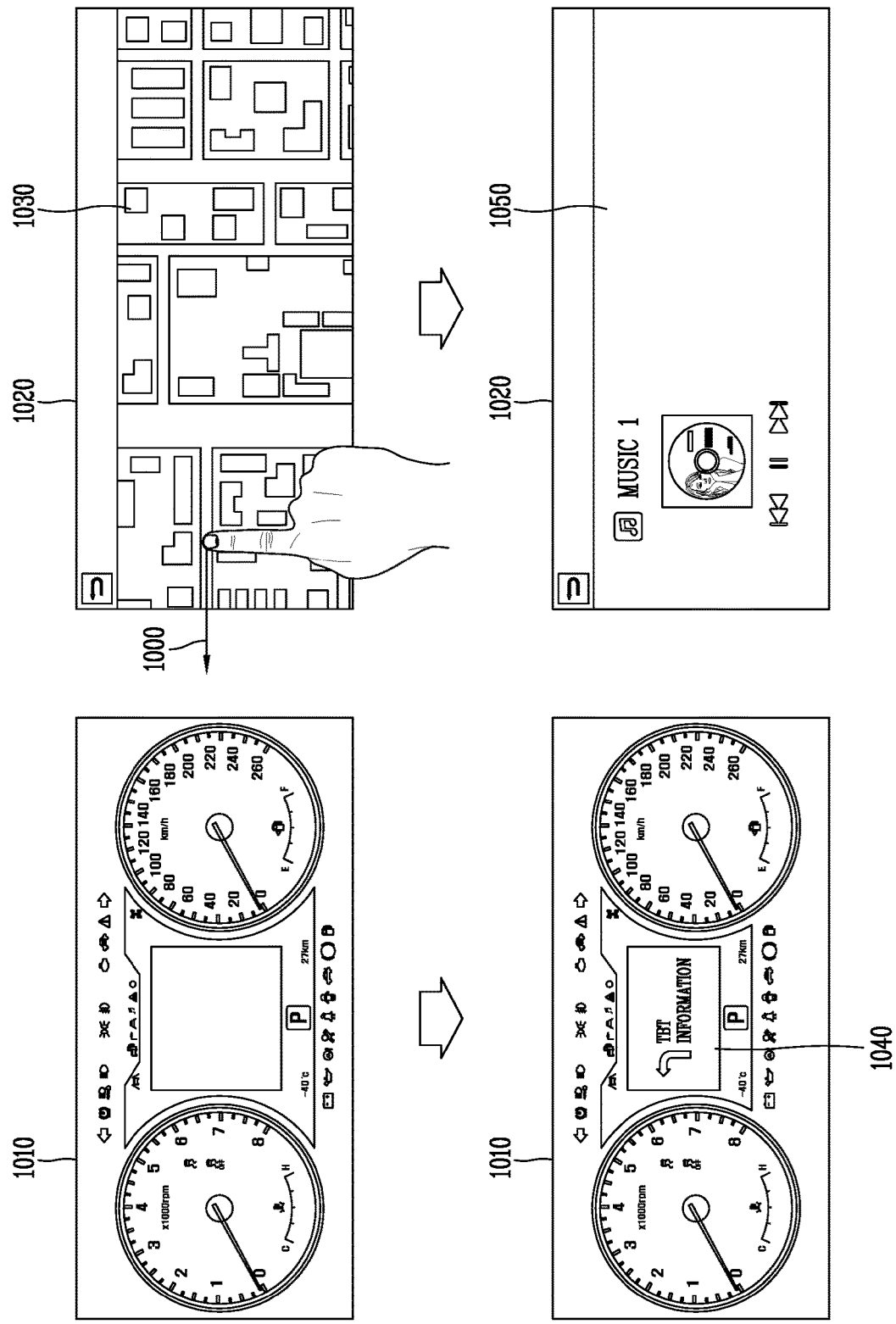
FIG. 10 is a conceptual view illustrating an embodiment of the present invention where a first execution screen is output.

FIG. 10 is a conceptual view illustrating a first embodiment where a first execution screen is output.

Referring to FIG. 10, a second execution screen 1030 of a navigation application may be output to a second display unit 1020. Here, a flicking gesture 1000 may be applied to the second display unit 1020 towards a first display unit 1010.

Accordingly, a first execution screen 1040 of a navigation application may be output to the first display unit 1010. The output of the second execution screen 1030 to the second display unit 1020 may be terminated.

In an embodiment, dashboard information may be being output to the first display unit 1010 (cluster), and the second execution screen 1030 of a navigation application may be being output to the second display unit 1020 (CID).

Here, a driver may apply a flicking gesture 1000 to the CID 1020 towards the cluster 1010.

Thus, the first execution screen 1040 of a navigation application may be output to the cluster 1010. In an embodiment, the first execution screen 1040 of a navigation application may be output between the dashboard information being output, or may be output as an upper layer or a lower layer.

The first execution screen 1040 output to the cluster 1010, and the second execution screen 1030 output to the CID 1020 may be different execution screens with respect to a road guidance function of a navigation application, and may include different amounts of information.

More specifically, the first execution screen 1040 may include only TBT information, and the second execution screen 1030 may include a map image, POI information, TBT information, destination information, stops information, etc.

The output of the second execution screen 1030 to the CID 1020 may be terminated. As a result, a home screen or an execution screen 1050 of another application may be output. For instance, an execution screen 1050 of a music application being currently executed may be output.

In another embodiment, the second execution screen 1030 may disappear by the driver's flicking gesture 1000, and an animation effect may be output such that the second execution screen 1030 may be converted into the new screen 1050 in a seamless manner.

The controller 820 can control the second display unit to maintain the display of the second execution screen if the first and second display units are selected according to a second condition while the second execution screen is being output to the second display unit, and may control the first display unit to start to display the first execution screen.

Figure 11:
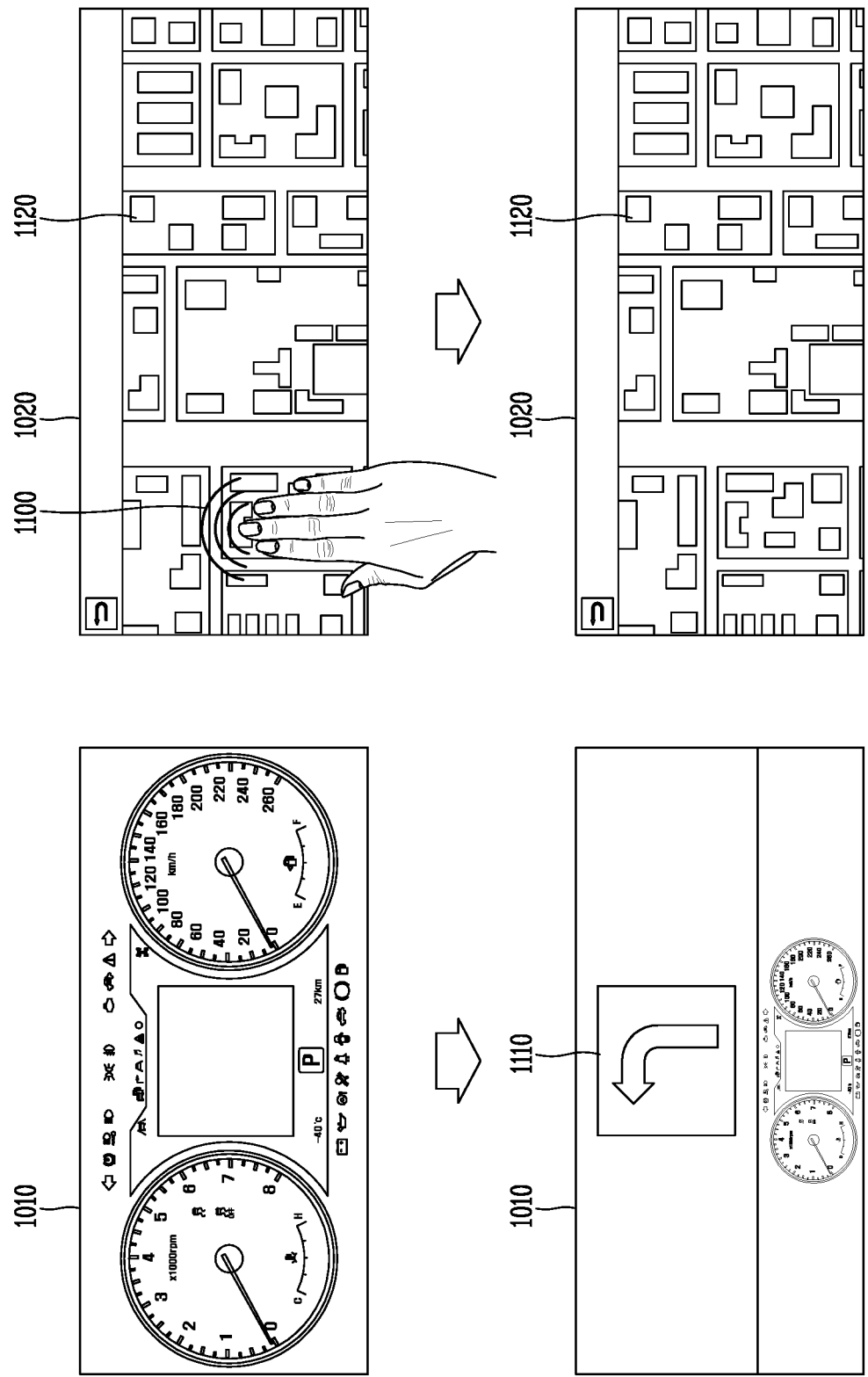
FIG. 11 is a conceptual view illustrating an embodiment of the present invention where a first execution screen is output.

FIG. 11 is a conceptual view illustrating a second embodiment where a first execution screen is output.

Referring to FIG. 11, a second execution screen 1120 of a navigation application may be output to the second display unit 1020. Here, a touch input 1100 can be applied to the second display unit 1020.

As a result, a first execution screen 1110 of a navigation application may be output to the first display unit 1010. The second execution screen 1120 may be continuously output to the second display unit 1020.

In an embodiment, dashboard information may be being output to the first display unit 1010 (cluster), and the second execution screen 1120 of a navigation application may be being output to the second display unit 1020 (CID).

Here, a driver may apply a touch input such as a short touch, a long touch, a double touch and a tap, to the CID 1020.

As a result, the first execution screen 1110 of a navigation application may be output to the cluster 1010. In an embodiment, the dashboard information being output may be output to a lower end of the cluster 1010 in a contracted manner, and the first execution screen 1110 of a navigation application may be output to a middle region of the cluster 1010.

As aforementioned, the first execution screen 1110 output from the cluster 1010, and the second execution screen 1120 output from the CID 1020 may be different execution screens with respect to a road guidance function of a navigation application, and may include different amounts of information.

More specifically, the first execution screen 1110 may include only TBT information, and the second execution screen 1120 may include a map image, POI information, TBT information, destination information, stops information, etc.

In an embodiment shown in FIGS. 10 and 11, the second execution screen being output to the second display unit 1020 may have its output terminated or maintained according to a predetermined condition.

The application may be a navigation application for providing road guidance information to a destination, and each of the first and second execution screens may include a map image provided from the navigation application.

In an embodiment, a first map image included in the first execution screen may be formed to have a first scale, and a second map image included in the second execution screen may be formed to have a second scale different from the first scale.

Figure 12:
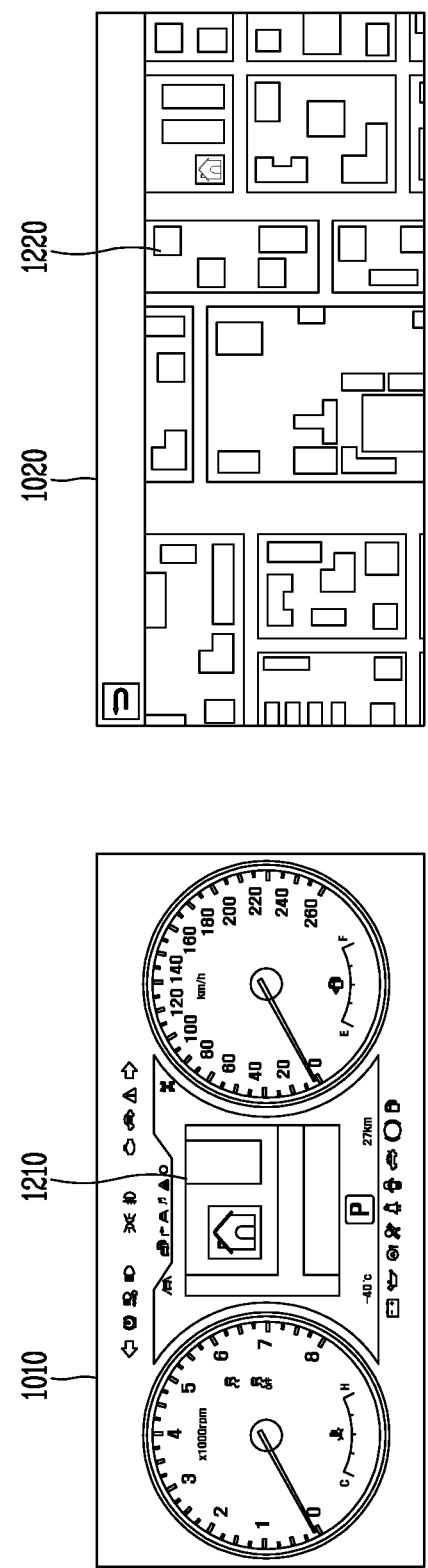
FIG. 12 is a conceptual view illustrating an embodiment where first and second execution screens are map images of different scales.

FIG. 12 is a conceptual view illustrating an embodiment where first and second execution screens are map images of different scales.

Referring to FIG. 12, as aforementioned, a second execution screen 1220 of a navigation application may be output to the CID 1020. And while dashboard information is being output to the cluster 1010, a preset driver's touch input or gesture input may be applied to the CID 1020.

As a result, a first execution screen 1210 of a navigation application may be output between the dashboard information of the cluster 1010, or may be output as an upper layer or a lower layer.

The first and second execution screens 1210, 1220 may include map images, and each of the map images may have a different scale.

In an embodiment, the first execution screen 1210 may be an image enlarged such that a predetermined region included in the second execution screen 1220 may be viewed in more detail. Here, the predetermined region may include a destination, a crossroad, a point where a driving direction is to be changed, a region where there exists an obstacle, etc.

In another embodiment, the first execution screen 1210 of a navigation application may be output when a distance up to a destination is within a predetermined value, as well as when a preset driver's touch input or gesture input is applied. That is, a map image showing an area near a destination may be output to the cluster 1010, near the destination.

As another example, if the vehicle approaches a point where a driving direction is to be changed, a crossroad, a region where there exists an obstacle, etc., a map image showing the vehicle in an enlarged manner may be output to the cluster 1010.

As aforementioned, the first and second execution screens may be different execution screens with respect to one function provided from the application, and an information amount of the first execution screen may be different from that of the second execution screen.

Figure 13:
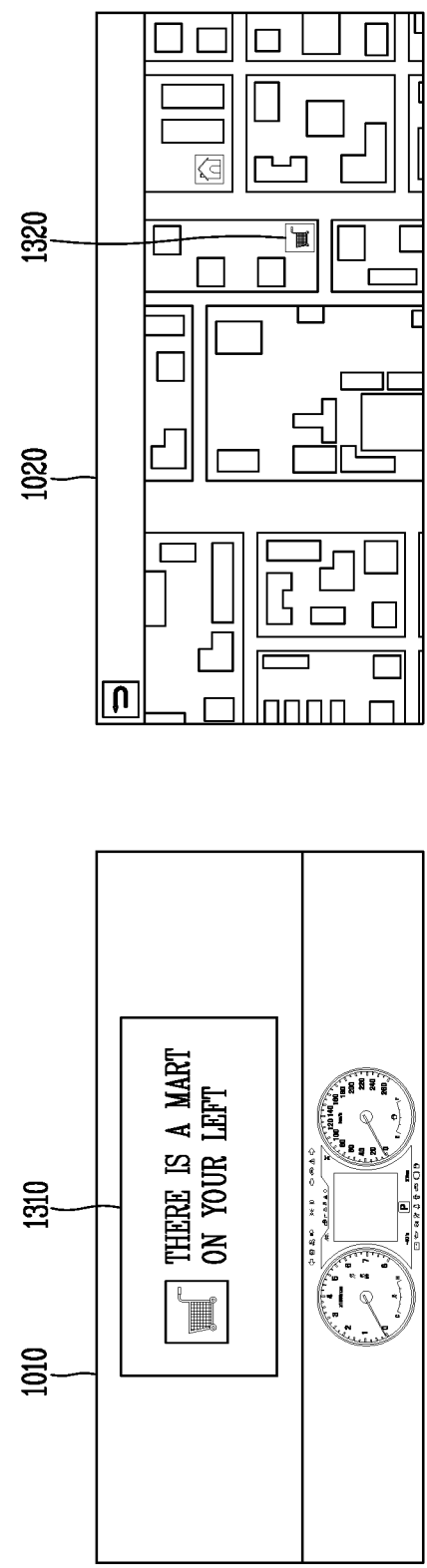
FIG. 13 is a conceptual view illustrating an embodiment where first and second execution screens have different amounts of information.

FIG. 13 is a conceptual view illustrating an embodiment where first and second execution screens have different amounts of information.

Referring to FIG. 13, as aforementioned, a second execution screen 1320 of a navigation application may be output to the CID 1020. And while dashboard information is being output to the cluster 1010, a preset driver's touch input or gesture input may be applied to the CID 1020.

As a result, dashboard information of the cluster 1010 may be output to a lower end of the cluster 1010 in a contracted manner, and a first execution screen 1310 of a navigation application may be output.

The first execution screen 1310 is simplified mainly with required information, and should not interrupt driving. Accordingly, the first execution screen 1310 may include information which briefly provides a road guidance with main roads or buildings.

In an embodiment, if there is a mart frequently visited by a driver, information indicating the mart or providing a road guidance to the mart may be output to the first execution screen 1310.

In another embodiment, the first execution screen 1310 of a navigation application may be output when the vehicle 100 enters a specific road or is near a specific building, as well as when a preset driver's touch input or gesture input is applied.

In another embodiment, 3D image information such as a building may be output to the cluster 1010, and 2D image information indicating a position of a building, etc. may be output to the CID 1020.

The first execution screen may include turn by turn (TBT) information, and the second execution screen may include information on points of interest (POI) positioned at a path to a destination, together with the TBT information.

Figure 14:
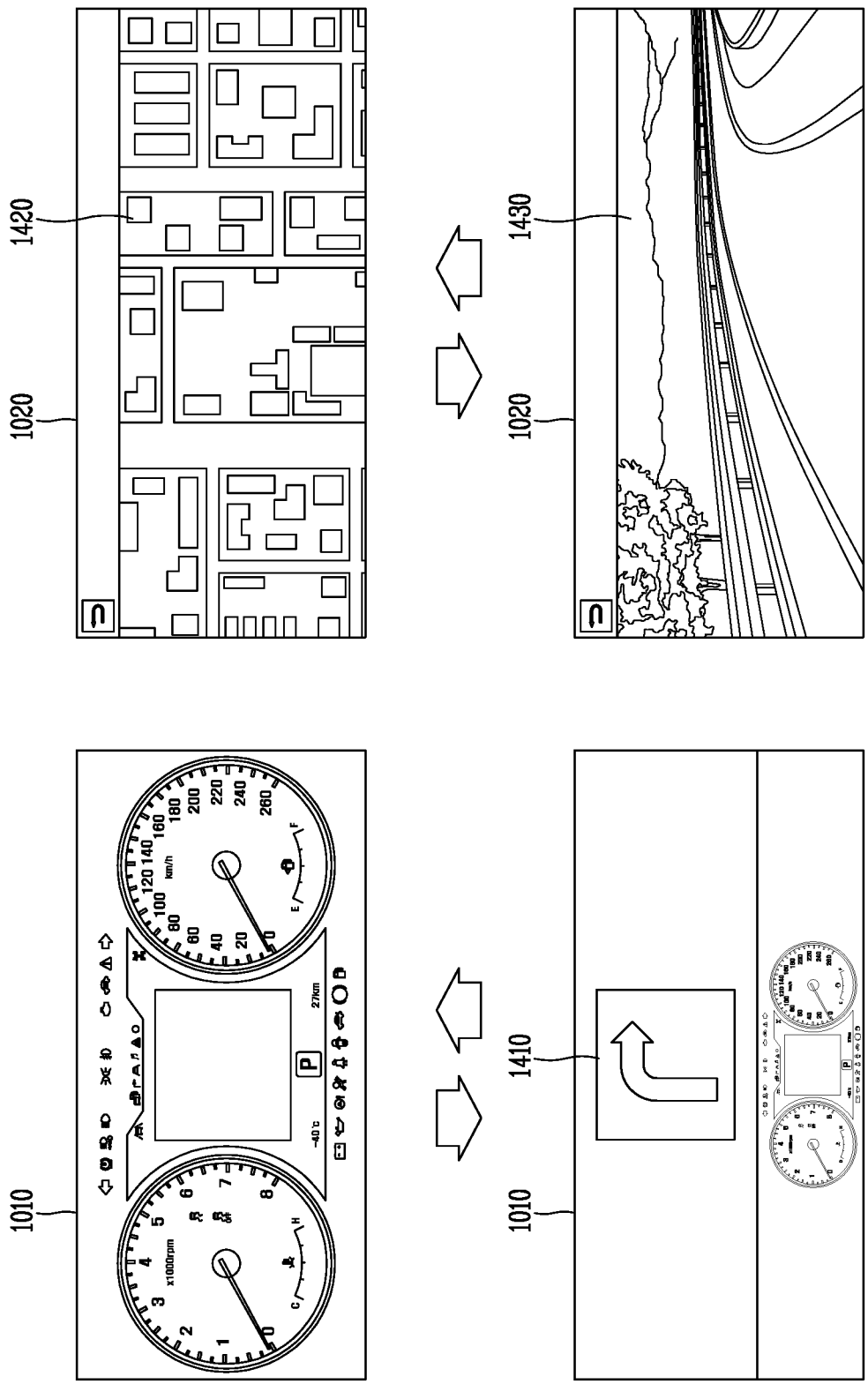
FIG. 14 is a conceptual view illustrating an embodiment where a first execution screen includes TBT information.

FIG. 14 is a conceptual view illustrating an embodiment where a first execution screen includes TBT information.

Referring to FIG. 14, as aforementioned, a second execution screen 1420 of a navigation application may be output to the CID 1020. And while dashboard information is being output to the cluster 1010, a preset driver's touch input or gesture input may be applied to the CID 1020. Alternatively, the current situation may be a situation where the vehicle 100 should change a driving direction.

Accordingly, TBT information 1410 may be output to the cluster 1010 as a first execution screen of a navigation application. Here, the dashboard information being output to the cluster 1010 may be output to a lower end of the cluster 1010 in a contracted manner.

In an embodiment, an image 1430 indicating a driving direction of the vehicle 100 based on the TBT information 1410 may be output to the CID 1020. That is, if the vehicle 100 turns right, the image 1430 disposed at a right region of the vehicle 100 may be output to the CID 1020.

In another embodiment, if the vehicle 100 is running according to the TBT information 1410, the cluster 1010 and the CID 1020 may return to a previous screen state.

More specifically, if the vehicle 100 turns right according to the TBT information 1410, the cluster 1010 may be output when only the dashboard information has been enlarged to the original size. And a road guidance screen 1420 may be output to the CID 1020.

In another embodiment, may be output a message which inquires whether a user agrees with a screen conversion to the previous screen state. Here, if the driver inputs a cancelation message, the screen conversion to the previous screen state may not be performed.

In another embodiment, a screen conversion may be performed according to the number of TBT information requiring a guidance within a predetermined section.

More specifically, while the vehicle 100 is running straight, dashboard information may be output to the cluster 1010, and the road guidance screen 1420 may be output to the CID 1020.

Then, if the vehicle 100 performs a direction conversion more than a predetermined number of times within a preset section, the TBT information 1410 may be output to the cluster 1010 together with the contracted dashboard information, while the vehicle is running at the predetermined section.

Then, if the vehicle 100 completes the direction conversion more than the predetermined number of times, the current screen may return to the initial state (the dashboard information is being output to the cluster 1010, and the road guidance screen 1420 is being output to the CID 1020).

If a preset condition is satisfied while the vehicle 100 is running, the current screen may be automatically converted. Then, if an event according to the preset condition is terminated or if another preset condition is satisfied, the current screen may return to the state before the screen conversion.

The controller 820 can control the first and second display units to change the first and second execution screens together, according to a user input applied to one of the first and second display units.

In an embodiment, if a preset user input is applied to the second execution screen, the controller 820 can control the second display unit to change a screen ratio of the second execution screen. And the controller 820 can control the first display unit to change an amount of TBT information output from the first execution screen, according to the changed screen ratio.

Figure 15:
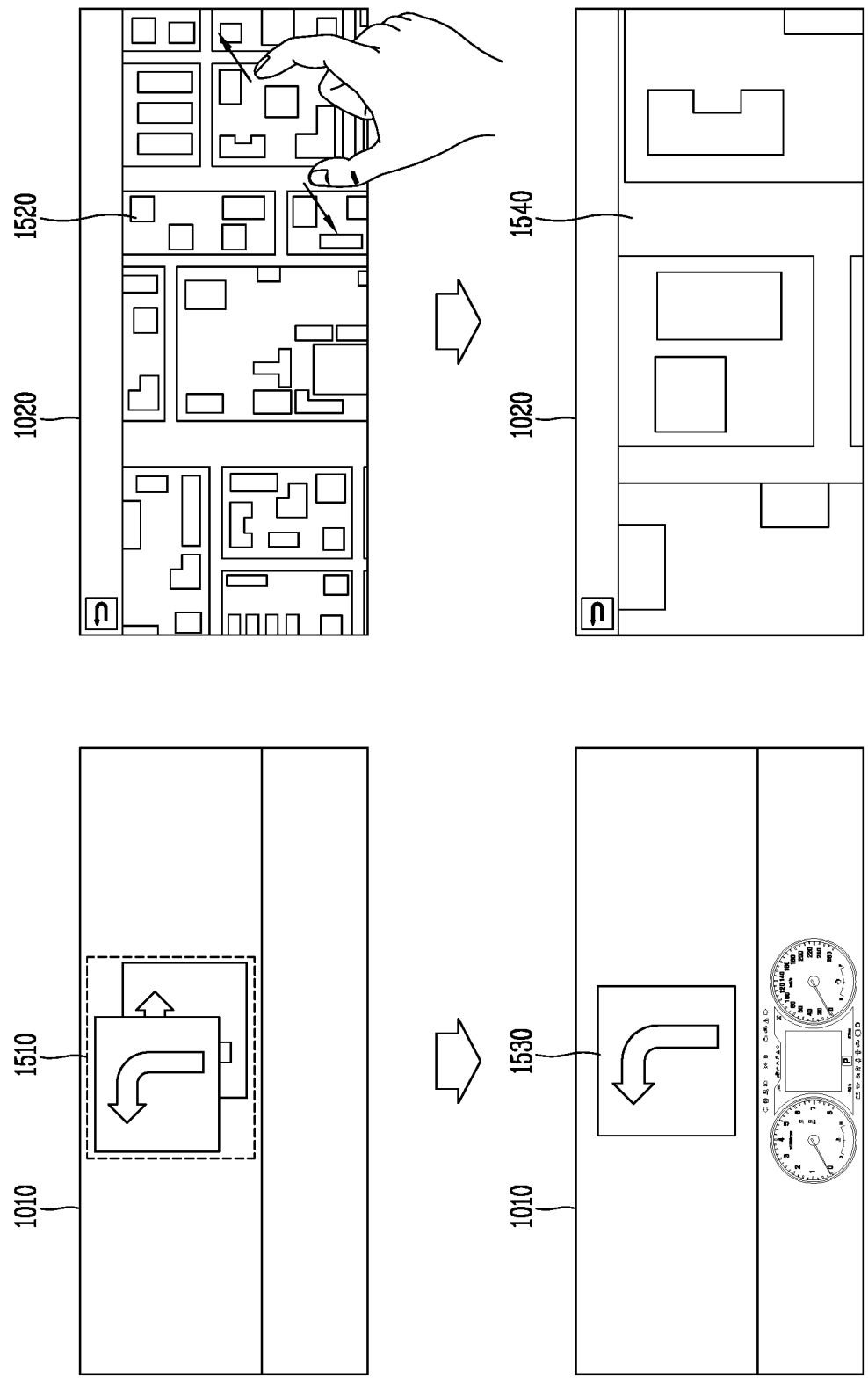
FIGS. 15 and 16 are conceptual views illustrating an embodiment where the number of TBT information included in a first execution screen is changed as a second execution screen is changed.
Figure 16:
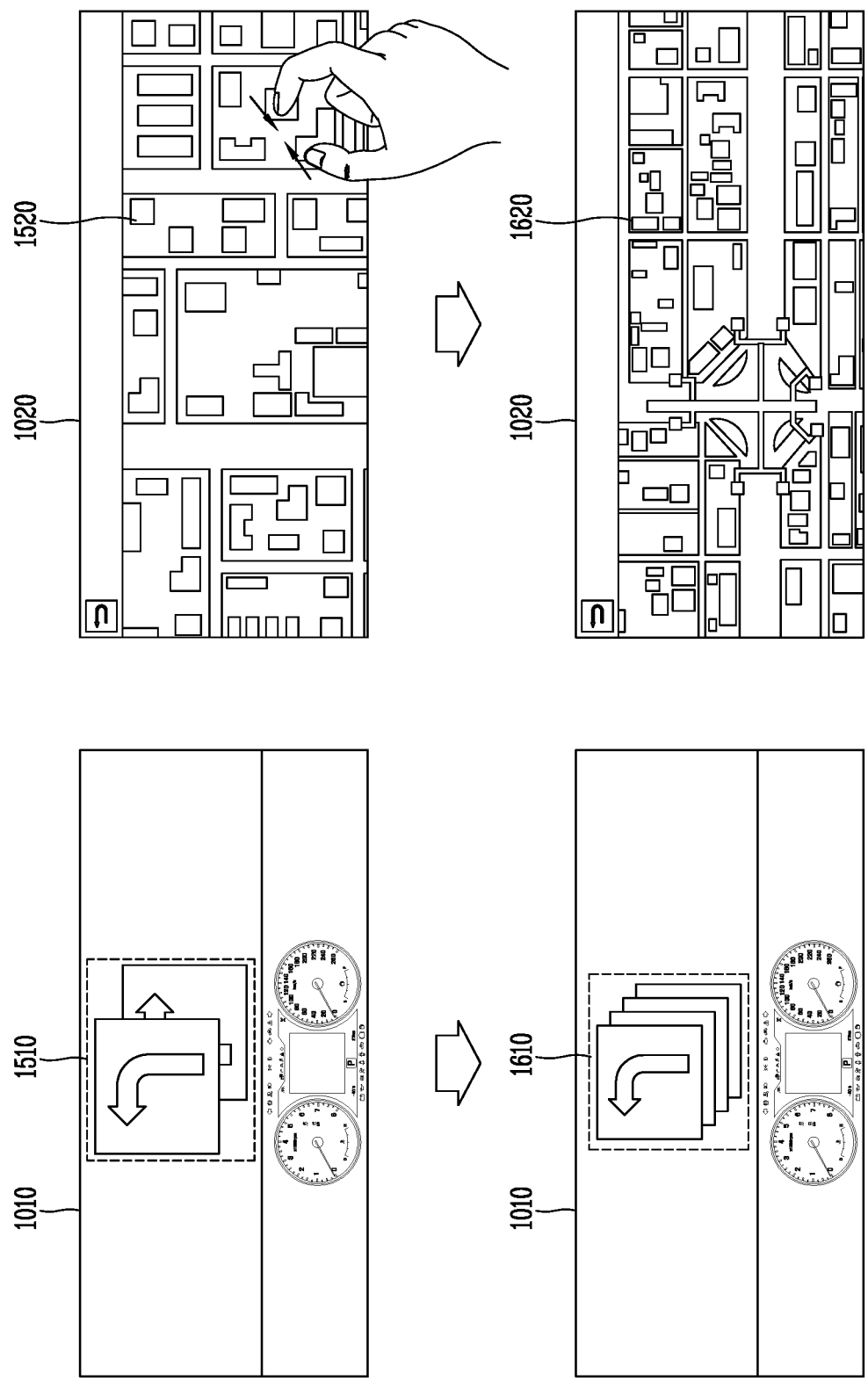

FIGS. 15 and 16 are conceptual views illustrating an embodiment where the number of TBT information included in a first execution screen is changed as a second execution screen is changed.

Referring to FIG. 15, as aforementioned, a road guidance screen 1520 may be output to the CID 1020, and TBT information 1510 may be output to the cluster 1010 together with contracted dashboard information.

In an embodiment, the number of the TBT information 1510 may be set according to a screen ratio of the road guidance screen 1520 being output to the CID 1020.

For instance, if the vehicle 100 makes a direction change two times on the road guidance screen 1520, two TBT information 1510 indicating the direction change may be output to the cluster 1010. In this instance, the first TBT information may be output to an upper position, and the second TBT information may be output to a lower position in an overlapped manner.

Alternatively, the first TBT information and the second TBT information may be output in parallel to each other. More specifically, the first TBT information may be output to the left, and the second TBT information may be output to the right.

In another embodiment, if a driver applies a pinch-out input to the CID 1020, the screen ratio of the road guidance screen 1520 may be changed. More specifically, an enlarged road guidance screen 1540 may be output according to a distance along which a pinch-output input has been applied.

As the screen being output from the CID 1020 has its ratio changed, the number of TBT information 1530 output from the cluster 1010 is also changeable.

In an embodiment, the vehicle 100 makes a direction change once on the enlarged road guidance screen 1540. As a result, only one TBT information 1530 may be output to the cluster 1010.

Referring to FIG. 16, as aforementioned with reference to FIG. 15, a road guidance screen 1520 may be output to the CID 1020, and TBT information 1510 may be output to the cluster 1010 together with contracted dashboard information.

In an embodiment, the number of the TBT information 1510 may be set according to a screen ratio of the road guidance screen 1520 being output to the CID 1020.

For instance, if the vehicle 100 makes a direction change two times on the road guidance screen 1520, two TBT information 1510 indicating the direction change may be output to the cluster 1010. In this instance, the first TBT information may be output to an upper position, and the second TBT information may be output to a lower position in an overlapped manner.

Alternatively, the first TBT information and the second TBT information may be output in parallel to each other. More specifically, the first TBT information may be output to the left, and the second TBT information may be output to the right.

In another embodiment, if a driver applies a pinch-in input to the CID 1020, the screen ratio of the road guidance screen 1520 may be changed. More specifically, a contracted road guidance screen 1620 may be output according to a distance along which a pinch-in input has been applied.

As the screen being output from the CID 1020 has its ratio changed, the number of TBT information 1610 output from the cluster 1010 is also changeable.

In an embodiment, the vehicle 100 makes a direction change a plurality of times on the contracted road guidance screen 1620. As a result, a plurality of TBT information 1610 may be output to the cluster 1010.

The plurality of TBT information 1610 may be displayed in an overlapped manner to be viewable according to a direction change order, or may be output sequentially from the left side. Here, the TBT information for the current driving may be further provided with an emphasis effect. For instance, the TBT information may be output to have a size, color, shape, etc. different from those of another TBT information.

In another embodiment, if the screen returns to the initial state (the dashboard information is output to the cluster 1010, and the road guidance information is output to the CID 1020) according to a predetermined condition, even if a pinch-in input or a pinch-output input is applied to the CID 1020 as shown in FIGS. 15 and 16, the screen output to the cluster 1010 is not changeable.

The controller 820 can control the first and second display units in a different manner, according to whether a preset user input is applied by a driver or a passenger.

In an embodiment, if the preset user input is applied by the driver, the controller 820 can control the first and second display units such that both of the first and second execution screens may be changed. Further, if the preset user input is applied by the passenger, the controller 820 can control the first and second display units such that the first execution screen may not be changed but the second execution screen may be changed.

Figure 17:
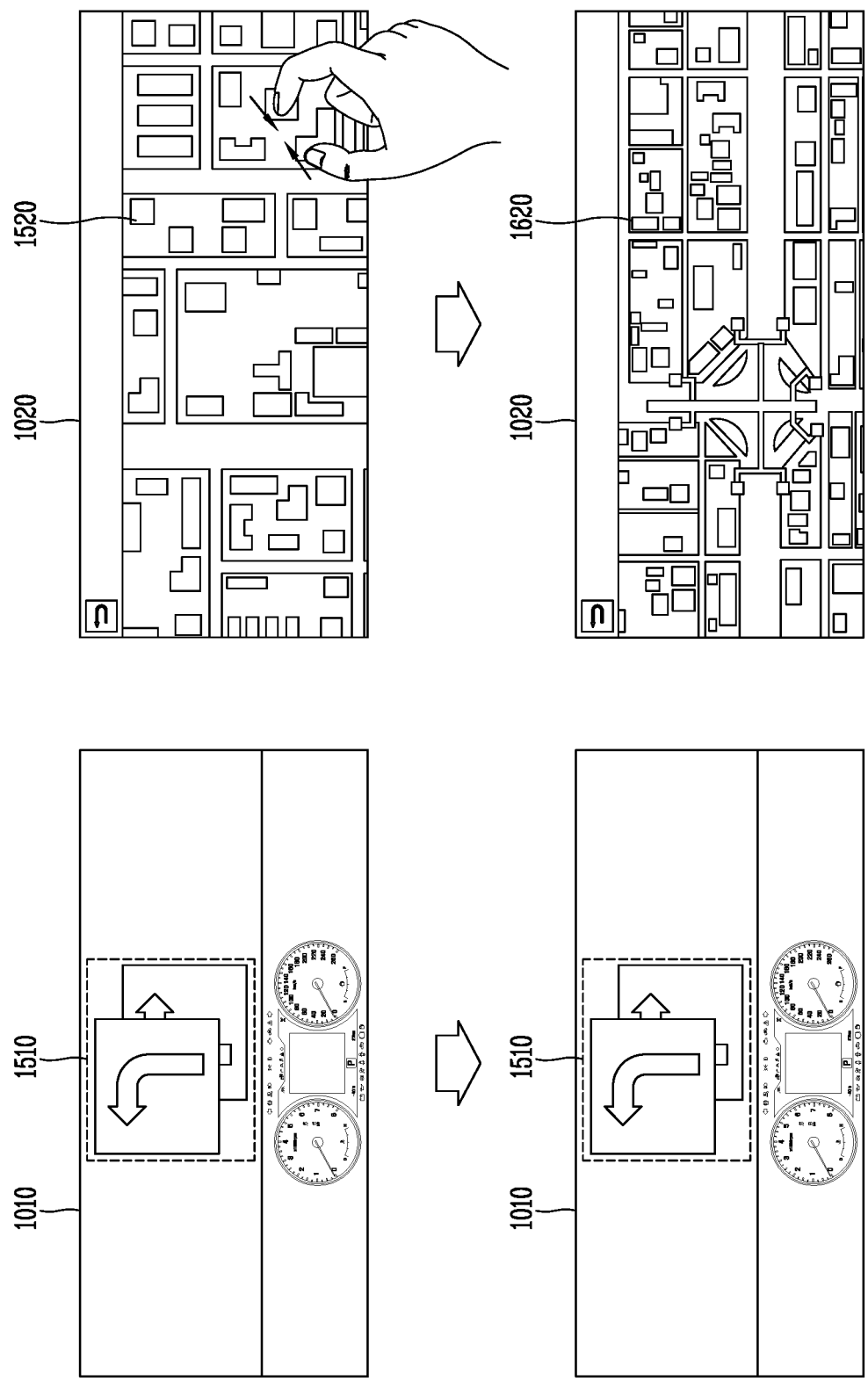
FIG. 17 is a conceptual view illustrating an embodiment where a first execution screen is not changed if a second execution screen is changed by a passenger.

FIG. 17 is a conceptual view illustrating an embodiment where a first execution screen is not changed if a second execution screen is changed by a passenger.

Referring to FIG. 17, as shown in FIG. 16, a road guidance screen 1520 may be output to the CID 1020, and TBT information 1510 may be output to the cluster 1010 together with contracted dashboard information.

Unlike FIG. 16, if a passenger applies a pinch-in input to the CID 1020, a screen ratio of the road guidance screen 1520 may be changed. More specifically, a contracted road guidance screen 1620 may be output according to a distance along which a pinch-in input has been applied.

However, the TBT information 1510 output to the cluster 1010 may not be changed.

That is, according to the embodiments shown in FIGS. 16 and 17, if a driver applies a predetermined input to the CID 1020, the screen output to the CID 1020 may have its ratio changed, and thus screen information output to the cluster 1010 may be also changed.

However, if a passenger applies a predetermined input to the CID 1020, only the screen output to the CID 1020 may have its ratio changed, and the screen information output to the cluster 1010 may not be changed.

In another embodiment, if the cluster 1010 returns to the original screen state, that is, if only dashboard information is output to the cluster 1010, the information output to the cluster 1010 is not changed, even if a driver applies an input to the CID 1020.

If the vehicle enters a region which is within a predetermined distance from a destination while the second execution screen is being output from the second display unit, the controller 820 can control the first display unit to output the first execution screen thereon.

Figure 18:
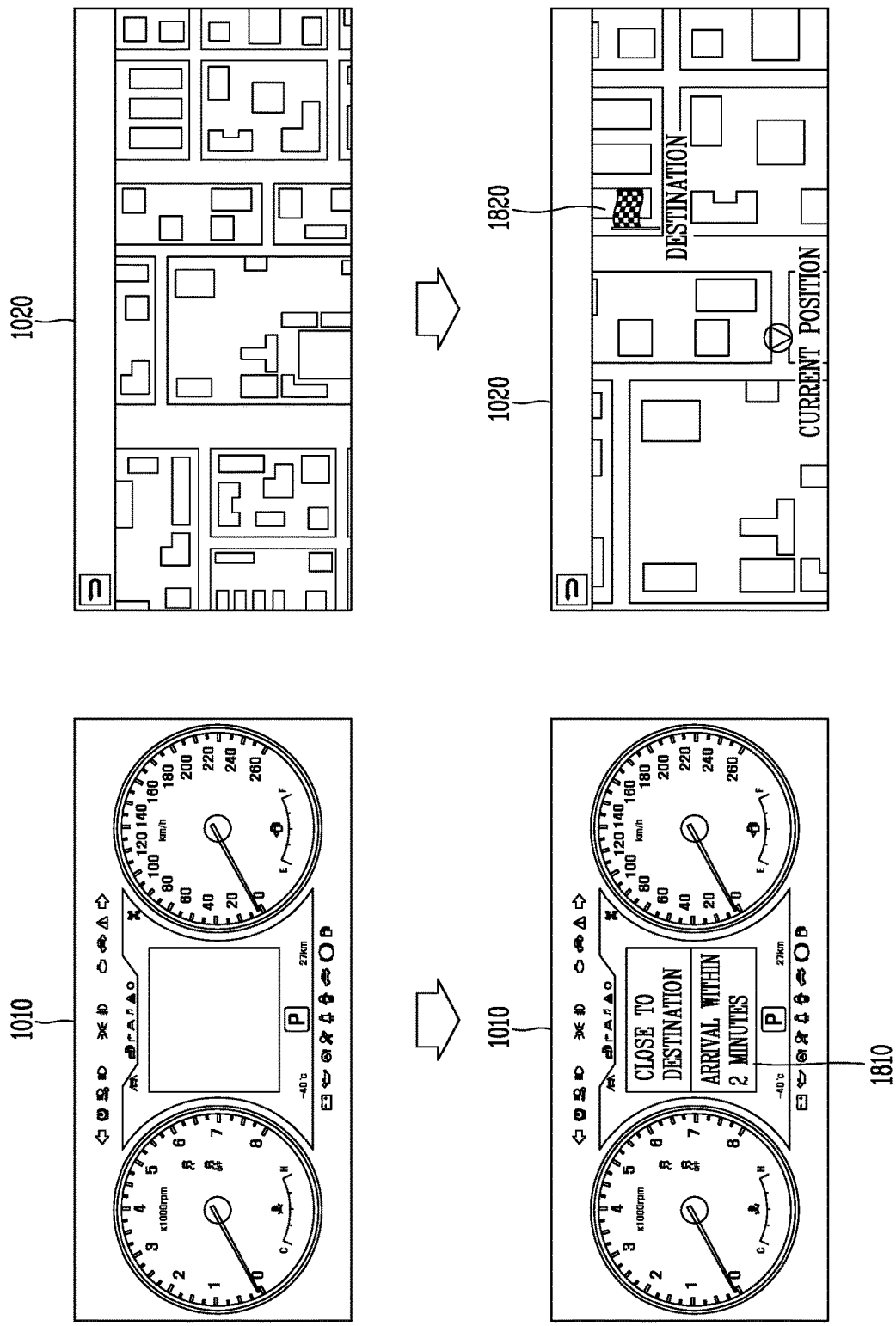
FIG. 18 is a conceptual view illustrating a first embodiment where a first execution screen is output as a vehicle reaches a spot near a destination.

FIG. 18 is a conceptual view illustrating a first embodiment where a first execution screen is output as the vehicle reaches a spot near a destination.

Referring to FIG. 18, dashboard information may be output to the cluster 1010, and road guidance information (a second execution screen) of a navigation application may be output to the CID 1020.

In an embodiment, if the vehicle 100 enters a region which is within a predetermined distance from a destination, a first execution screen 1810 of a navigation application, which informs that the vehicle is positioned near the destination, may be output between dashboard information.

Here, a distance to the destination, a time taken to reach the destination, etc. may be included in the first execution screen 1810. And a second execution screen output to the CID 1020 may include a map image 1820 which displays a current position of the vehicle 100, a destination position, etc.

If the vehicle 100 enters a specific road while the second execution screen is being output to the second display unit, the controller 820 can control the first display unit to output the first execution screen thereon.

Figure 19:
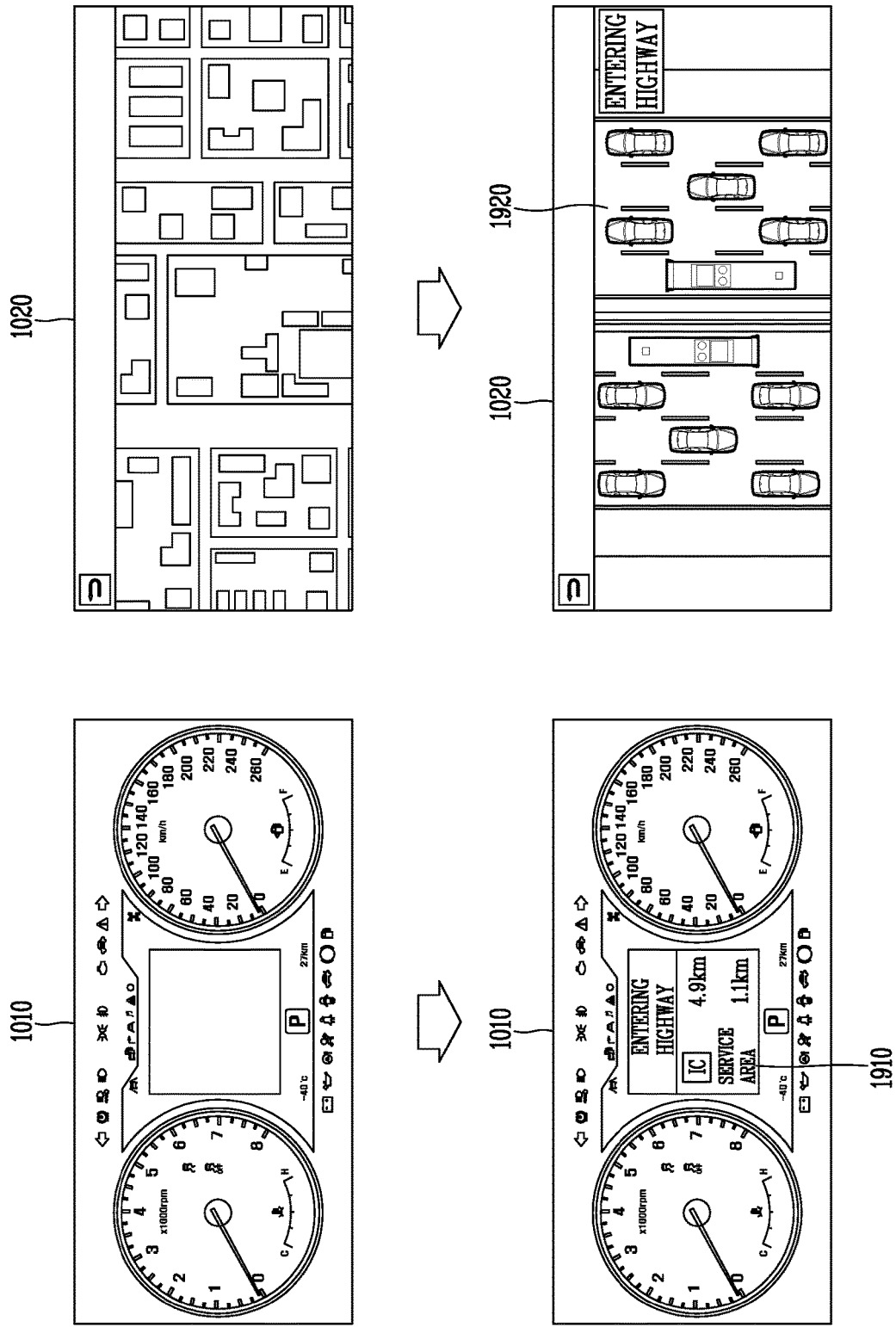
FIG. 19 is a conceptual view illustrating a first embodiment where a first execution screen is output as a vehicle reaches a highway.

FIG. 19 is a conceptual view illustrating a first embodiment where a first execution screen is output as the vehicle reaches a highway.

Referring to FIG. 19, dashboard information may be output to the cluster 1010, and road guidance information (a second execution screen) of a navigation application may be output to the CID 1020.

In an embodiment, if the vehicle 100 enters a highway, a first execution screen 1910 of a navigation application, which provides information related to the highway, may be output between dashboard information.

Here, the first execution screen 1910 may include information on a highway service area (rest area), an IC, a JC, etc., and a second execution screen output to the CID 1020 may include a map image 1920 which displays a current position of the vehicle 100, a highway, a service area, an IC, a JC, etc.

Figure 20:
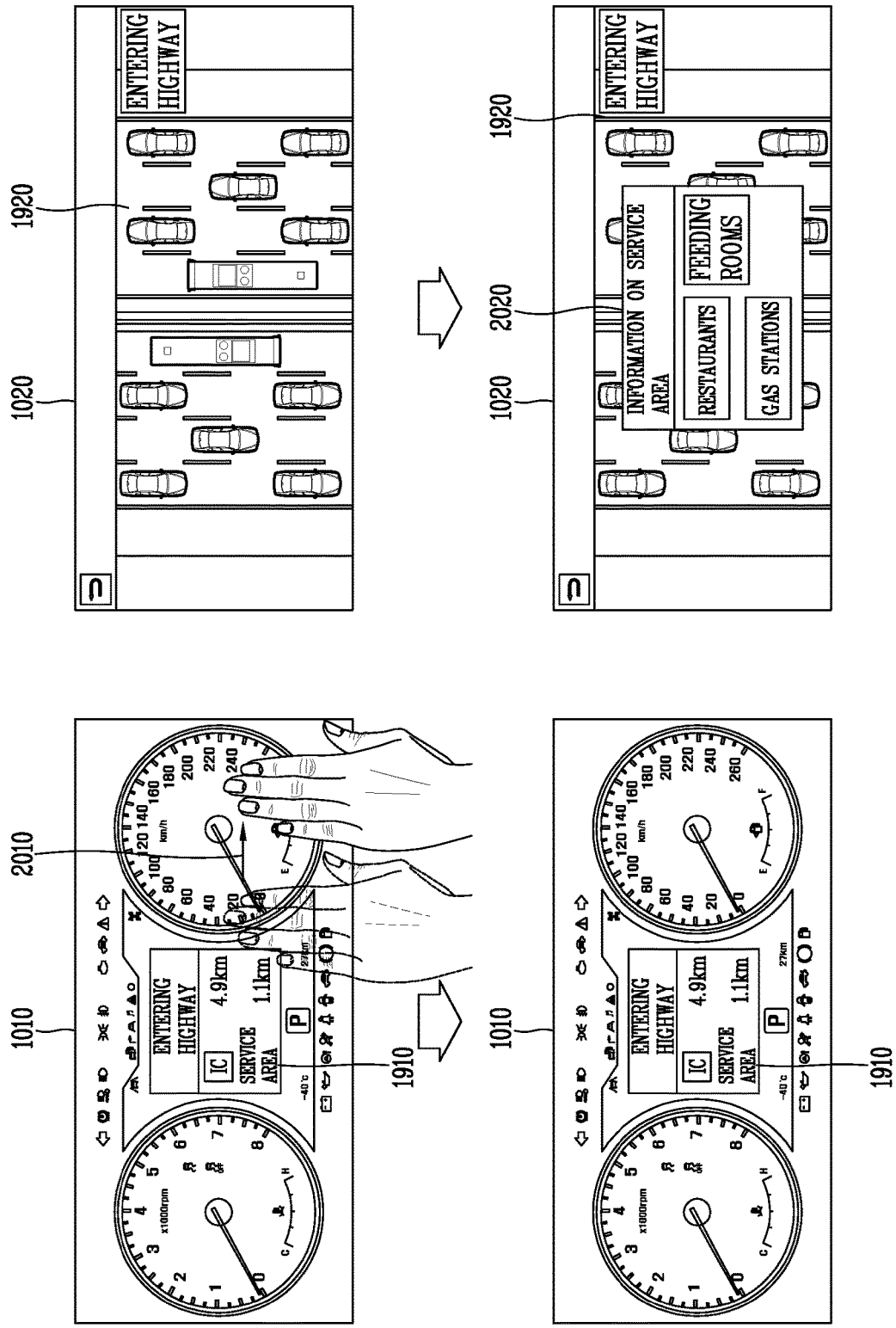
FIG. 20 is a conceptual view illustrating an embodiment where detailed information of contents output to a first execution screen is output to a second execution screen.

FIG. 20 is a conceptual view illustrating an embodiment where detailed information of contents output to a first execution screen is output to a second execution screen.

Referring to FIG. 20, in an embodiment consecutive to that of FIG. 19, a first execution screen 1910 of a navigation application, which provides information related to a highway, may be output to the cluster 1010 between dashboard information. Here, the first execution screen 1910 may include information on a highway service area (rest area), an IC, a JC, etc.

And a second execution screen output to the CID 1020 may include a map image 1920 which displays a current position of the vehicle 100, a highway, a service area, an IC, a JC, etc.

Here, if a driver applies a flicking gesture 2010 to the cluster 1010 towards the CID 1020, detailed contents 2020 of information included in the first execution screen 1910 may be output to the CID 1020. For instance, detailed contents 2020 such as a position of a corresponding service area, a type of a restaurant inside the service area, prices at a gas station, etc. may be output to the CID 1020.

The controller 820 can control the first display unit to output an around view monitoring (AVM) image captured in a first direction thereon, according to a predetermined condition, while an AVM image captured in a second direction is being output from the second display unit.

In an embodiment, the predetermined condition may include a situation that an object approaching from the first direction is sensed.

In another embodiment, the predetermined condition may include a situation that the first direction is a driver's blind spot.

Figure 21:
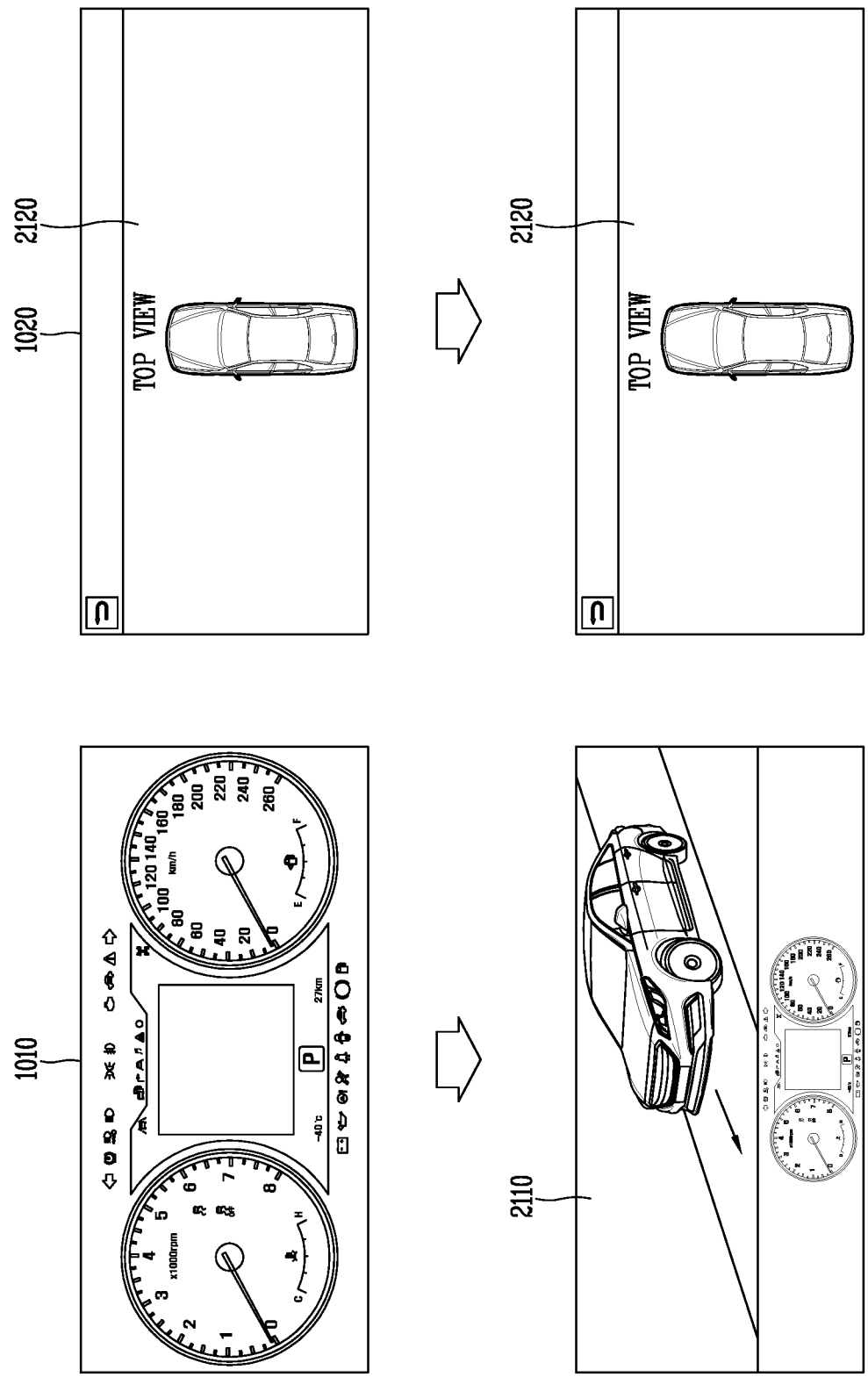
FIG. 21 is a conceptual view illustrating an embodiment where images captured in different directions are output to first and second execution screens.

FIG. 21 is a conceptual view illustrating an embodiment where images captured in different directions are output to first and second execution screens.

Referring to FIG. 21, dashboard information may be output to the cluster 1010, and a top view image 2120 of the vehicle 100 may be output to the CID 1020.

In an embodiment, if a moving object approaching to the vehicle 100 is sensed, an image 2110 indicating an approaching direction of the moving body may be output to the cluster 1010. Here, the dashboard information may be output to a lower end of the cluster 1010 in a contracted manner, and the output may be terminated if the vehicle 100 runs at a very low speed.

In another embodiment, if a blind spot occurs or a side mirror is blocked as the vehicle 100 enters a narrow road, an image of the blind spot or an image of the blocked side mirror may be output to the cluster 1010.

In another embodiment, if the vehicle 100 enters a specific building or parking lot, or if a reverse gear is operated, the dashboard information may be output to a lower end of the cluster 1010 in a contracted manner, and an image indicating a predetermined direction captured may be output to the cluster 1010.

A third execution screen, another execution screen of an application may be output to one of the first and second display units. Alternatively, the third execution screen may be output to a third display unit.

Figure 22:
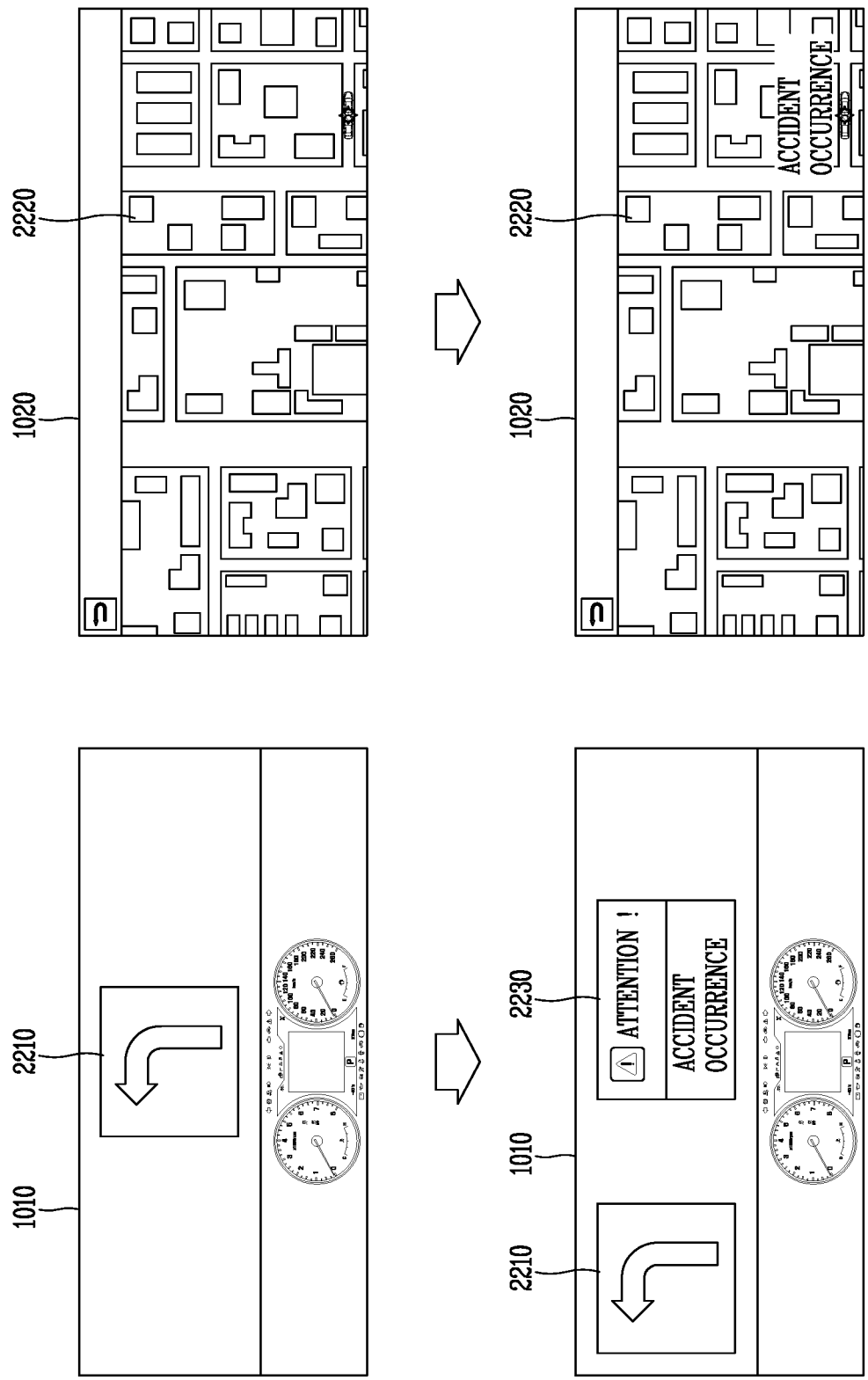

FIGS. 22 and 23 are conceptual views illustrating an embodiment where a third execution screen is output.

Referring to FIG. 22, TBT information 2210 may be output to the cluster 1010, and road guidance information 2220 may be output to the CID 1020.

If an accident occurs on a driving path, a map image 2220 output to the CID 1020 may display a current position of the vehicle 100, an accident occurrence spot, etc.

And summary information 2230 related to contents of a corresponding accident may be output to the cluster 1010. For instance, dashboard information may be output to a lower end of the cluster 1010 in a contracted manner, the TBT information 2210 may be output to the left, and the summary information 2230 related to contents of a corresponding accident may be output to the right.

In another embodiment, the TBT information 2210 may be output to the cluster 1010 by a driver's first flicking input.

Then, if an accident occurrence content is output to the map image 2220, and if a driver applies a second flicking input towards the cluster 1010, the summary information 2230 related to contents of a corresponding accident may be output to the cluster 1010.

In another embodiment, the output of the TBT information 2210 may be terminated, and only the summary information 2230 related to contents of a corresponding accident may be output to the cluster 1010. Alternatively, the summary information 2230 related to contents of a corresponding accident may be output as an upper layer of the TBT information 2210.

Referring to FIG. 23, similar to FIG. 22, TBT information 2210 may be output to the cluster 1010, and road guidance information 2220 may be output to the CID 1020.

If an accident occurs on a driving path, a map image 2220 output to the CID 1020 may display a current position of the vehicle 100, an accident occurrence spot, etc.

And summary information 2310 related to contents of a corresponding accident may be output to a windshield 2300. For instance, the summary information 2310 related to contents of a corresponding accident may include a position of an accident spot, a spot image, a distance from the vehicle 100, etc.

In another embodiment, the TBT information 2210 may be output to the cluster 1010 by a driver's first flicking input.

Then, if an accident occurrence content is output to the map image 2220, and if a driver applies a second flicking input towards the windshield 2300, the summary information 2310 related to contents of a corresponding accident may be output to the windshield 2300.

Hereinafter, additional embodiments will be explained.

If there is a speed camera over a road on which the vehicle is running, or if the vehicle 100 enters an area having a limited speed, information indicating that may be output to the CID 1020. And a speed dashboard of the cluster 1010 may be displayed in an emphasized manner. For instance, the speed dashboard may be displayed in a different color or size, or may be displayed in a flickering manner.

The vehicle control device mounted to the vehicle, and the method for controlling the vehicle according to an embodiment of the present invention may have the following advantages.

According to at least one of the embodiments of the present invention, a display unit for outputting an execution screen of an application may be selected according to a predetermined condition.

In an embodiment, information being output to the CID may be output to the cluster after its essential information is summarized. This may allow a driver to check information absolutely required for driving, easily and rapidly.

In another embodiment, since the display unit is controlled in a different manner according to whether an input is applied by a driver or a passenger, the passenger may be prevented from taking an action which may be an obstacle to driving.

The foregoing present invention may be implemented as codes readable by a computer on a medium written by the program. The computer-readable media may include all kinds of recording devices in which data readable by a computer system is stored. Examples of the computer-readable media may include ROM, RAM, CD-ROM, magnetic tape, floppy disk, and optical data storage device, and the like, and also include a device implemented in the form of a carrier wave (for example, transmission via the Internet). In addition, the computer may include a processor or controller. Accordingly, the detailed description thereof should not be construed as restrictive in all aspects but considered as illustrative. The scope of the invention should be determined by reasonable interpretation of the appended claims and all changes that come within the equivalent scope of the invention are included in the scope of the invention.

What is claimed is:

1. A vehicle control device for controlling a vehicle including first and second display units disposed at different positions therein, the vehicle control device comprising:
a communication unit configured to communicate with the first and second display units; and
a controller configured to:
in response to an occurrence of a preset condition including a first condition and a second condition, make a selection of at least one of the first display unit and the second display unit,
display a first execution screen of an application on the first display unit or a second execution screen of the application on the second display unit according to the selection, or change the first execution screen displayed on the first display unit or the second execution screen displayed on the second display unit according to the selection,
determine that the vehicle is entered within a predetermined distance from a destination while the first display unit displays a dashboard execution screen on which the first execution screen is not displayed and the second execution screen is displayed on the second display unit, and
control the first execution screen to start being displayed on the first display unit while the second execution screen is displayed on the second display unit based on the determination that the vehicle is entered within the predetermined distance; wherein the controller is further configured to: in response to both the first display unit and the second display unit being selected according to an occurrence of the second condition while the second execution screen is being displayed on the second display unit, maintain display of the second execution screen on the second display unit and start display of the first execution screen on the first display unit, and wherein the second condition includes a situation that the vehicle is entered within a predetermined the predetermined distance from the destination.

2. The vehicle control device of claim 1, wherein the controller is further configured to:
in response to the first display unit being selected according to an occurrence of the first condition while the second execution screen is displayed on the second display unit, terminate display of the second execution screen on the second display unit and start display of the first execution screen on the first display unit.

3. The vehicle control device of claim 1, wherein the controller is further configured to:
display the second execution screen including the vehicle in an enlarged manner and a current position of the vehicle on the second display unit when the first execution screen is on the first display unit.

4. The vehicle control device of claim 3, wherein the controller is further configured to:
in response to a user input applied to one of the first and second display units, change both of the first and second execution screens respectively displayed on the first and second display units together at a same time.

5. The vehicle control device of claim 1, wherein the application is a navigation application for providing road guidance information to a destination, and
wherein the first and second execution screens include map images provided from the navigation application.

6. The vehicle control device of claim 5, wherein a first map image having a first scale is included in the first execution screen, and a second map image having a second scale is included in the second execution screen, and
wherein the first scale is different than the second scale.

7. The vehicle control device of claim 6, wherein the first execution screen includes turn by turn (TBT) information, and the second execution screen includes information on points of interest (POI) positioned along a path to the destination and TBT information.

8. The vehicle control device of claim 7, wherein the controller is further configured to:
in response to a preset user input applied to the second execution screen, change a screen ratio or the second scale of the second execution screen and change an amount of the turn by turn (TBT) information in the first execution screen based a changed amount of the screen ratio of the second execution screen or a changed amount the second scale of the second execution screen.

9. The vehicle control device of claim 1, wherein the controller is further configured to:
control the first and second display units in different manners, according to whether a preset user input is applied by a driver or a passenger.

10. The vehicle control device of claim 9, wherein the controller is further configured to:
in response to the preset unit input being applied by the driver, change both of the first and second execution screens respectively displayed on the first and second display units, and
in response to the preset unit input being applied by the passenger, change the second execution screen displayed on the second display unit and do not change the first execution screen displayed on the first display unit.

11. The vehicle control device of claim 1, wherein the controller is further configured to:
in response to the vehicle traveling onto a specific road while the second execution screen is displayed on the second display unit, display the first execution screen on the first display unit.

12. The vehicle control device of claim 1, wherein the controller is further configured to:
display a first around view monitoring (AVM) image captured in a first direction on the first display unit according to a predetermined condition, while a second AVM image captured in a second direction is displayed on the second display unit.

13. The vehicle control device of claim 12, wherein the preset condition includes sensing an object approaching from the first direction.

14. The vehicle control device of claim 12, wherein the preset condition includes the first direction being directed toward a blind spot of the driver.

15. A method for controlling a vehicle, the method comprising:
in response to an occurrence of a preset condition including a first condition and a second condition, making a selection of at least one of a first display unit and a second display unit disposed at different positions in the vehicle;
displaying a first execution screen of an application on the first display unit or a second execution screen of the application on the second display unit according to the selection, or changing the first execution screen displayed on the first display unit or the second execution screen displayed on the second display unit according to the selection;
determining that the vehicle is entered within a predetermined distance from a destination while the first display unit displays a dashboard execution screen on which the first execution screen is not displayed and the second execution screen is displayed on the second display unit; and
controlling the first execution screen to start being displayed on the first display unit while the second execution screen is displayed on the second display unit based on the determination that the vehicle is entered within the predetermined distance; in response to the first display unit and the second display unit being selected according to an occurrence of the second condition while the second execution screen is being displayed on the second display unit, maintaining display of the second execution screen on the second display unit and starting display of the first execution screen on the first display unit, wherein the second condition includes a situation that the vehicle is entered within a predetermined distance from a destination.

16. The method of claim 15, further comprising:
in response to the first display unit being selected according to an occurrence of the first condition while the second execution screen is displayed on the second display unit, terminating display of the second execution screen on the second display unit and starting display of the first execution screen on the first display unit.

17. The method of claim 15, further comprising:
displaying the second execution screen including the vehicle in an enlarged manner and a current position of the vehicle on the second display unit when the first execution screen is on the first display unit.

* * * * *